(12) United States Patent
Hu et al.

(10) Patent No.: US 12,432,562 B2
(45) Date of Patent: Sep. 30, 2025

(54) METHOD FOR PROTECTING TRUNCATED PARAMETER AND APPARATUS

(71) Applicant: Huawei Technologies Co., Ltd., Shenzhen (CN)

(72) Inventors: Li Hu, Shanghai (CN); Zhenglei Huang, Beijing (CN); Rong Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 609 days.

(21) Appl. No.: 17/738,785

(22) Filed: May 6, 2022

(65) Prior Publication Data

US 2022/0264305 A1 Aug. 18, 2022

Related U.S. Application Data

(63) Continuation of application No. PCT/CN2019/116867, filed on Nov. 8, 2019.

(51) Int. Cl.
*H04W 4/00* (2018.01)
*H04W 8/26* (2009.01)
(Continued)

(52) U.S. Cl.
CPC ........... *H04W 12/106* (2021.01); *H04W 8/26* (2013.01); *H04W 12/037* (2021.01);
(Continued)

(58) Field of Classification Search
CPC .. H04W 12/037; H04W 12/106; H04W 76/10
See application file for complete search history.

(56) References Cited

U.S. PATENT DOCUMENTS

| | | | |
|---|---|---|---|
| 10,771,978 B2 * | 9/2020 | Ben Henda | H04W 12/106 |
| 2008/0118067 A1 * | 5/2008 | Jiang | H04W 12/02 380/270 |

(Continued)

FOREIGN PATENT DOCUMENTS

| | | |
|---|---|---|
| CN | 101541076 A | 9/2009 |
| CN | 107396455 A | 11/2017 |

(Continued)

OTHER PUBLICATIONS

3GPP TS 24.501 V16.2.0, Sep. 2019, "3rd Generation Partnership Project; Technical Specification Group Core Network and Terminals; Non-Access-Stratum (NAS) protocol for 5G System (5GS); Stage 3 (Release 15)," 610 pages.

(Continued)

*Primary Examiner* — Shantell L Heiber
(74) *Attorney, Agent, or Firm* — Conley Rose, P.C.

(57) ABSTRACT

A method for protecting a truncated parameter includes that a mobility management network element determines whether a terminal that accesses a network meets a preset condition, where the preset condition includes that the terminal uses a control plane cellular Internet of things (CIoT) 5th generation system (5GS) optimization function. The mobility management network element sends, to the terminal when the terminal meets the preset condition, a downlink non-access stratum (NAS) message on which NAS security protection is performed using a NAS security context, where the downlink NAS message includes a truncated parameter.

24 Claims, 10 Drawing Sheets

(51) Int. Cl.
H04W 12/037 (2021.01)
H04W 12/106 (2021.01)
H04W 60/04 (2009.01)
H04W 76/19 (2018.01)
H04W 76/20 (2018.01)
(52) U.S. Cl.
CPC .......... H04W 60/04 (2013.01); H04W 76/19 (2018.02); H04W 76/20 (2018.02)

(56) References Cited

U.S. PATENT DOCUMENTS

| | | | |
|---|---|---|---|
| 2009/0111428 A1* | 4/2009 | Blommaert | H04W 12/041 455/445 |
| 2009/0111476 A1 | 4/2009 | Hamalainen et al. | |
| 2015/0181549 A1* | 6/2015 | Batada | H04W 4/33 455/456.1 |
| 2017/0070880 A1* | 3/2017 | Hahn | H04W 12/02 |
| 2018/0192398 A1 | 7/2018 | Lee et al. | |
| 2018/0199306 A1 | 7/2018 | Edge et al. | |
| 2018/0206093 A1* | 7/2018 | Jain | H04W 92/00 |
| 2018/0227826 A1* | 8/2018 | Abraham | H04W 40/248 |
| 2019/0200265 A1 | 6/2019 | Yu et al. | |
| 2019/0222489 A1 | 7/2019 | Shan | |
| 2019/0254094 A1 | 8/2019 | Babu et al. | |
| 2020/0396587 A1 | 12/2020 | Kim et al. | |
| 2021/0258797 A1* | 8/2021 | Chandramouli | H04L 9/0838 |

FOREIGN PATENT DOCUMENTS

| | | |
|---|---|---|
| CN | 107925525 A | 4/2018 |
| CN | 108377518 A | 8/2018 |
| CN | 109983788 A | 7/2019 |
| EP | 3240350 A1 | 11/2017 |
| EP | 3402237 A1 | 11/2018 |
| EP | 3565373 A1 | 11/2019 |
| KR | 20190054982 A | 5/2019 |
| RU | 2451429 C2 | 5/2012 |
| WO | 2017171924 A1 | 10/2017 |
| WO | 2018169743 A1 | 9/2018 |
| WO | 2018236819 A1 | 12/2018 |
| WO | 2019078964 A1 | 4/2019 |
| WO | 2019183834 A1 | 10/2019 |
| WO | 2019193538 A1 | 10/2019 |

OTHER PUBLICATIONS

3GPP TS 33.401 V15.9.0, Sep. 2019, "3rd Generation Partnership Project; Technical Specification Group Services and System Aspects; 3GPP System Architecture Evolution (SAE) Security architecture (Release 15)," 163 pages.

3GPP TS 36.331 V15.7.0, Sep. 2019, "3rd Generation Partnership Project; Technical Specification Group Radio Access Network; Evolved Universal Terrestrial Radio Access (E-UTRA); Radio Resource Control (RRC); Protocol specification (Release 15)," 962 pages.

Huawei, et al., "Introduction of RRC Connection Re-Establishment for CP," SA WG2 Meeting #135, S2-1909252, Split, Croatia, Oct. 14-18, 2019, 2 pages.

Huawei, et al., Introduction of RRC Connection Re-Establishment for CP3GPP TSG-WG SA2 Meeting #135, S2-1909253, Split, Croatia, Oct. 14-18, 2019, 2 pages.

"Reply LS on RRC Connection Reestablishment for CP for NB-IoT connected to 5GC," 3GPP TSG SA WG2 Meeting #135, S2-1909254, Split, Croatia, Oct. 14-18, 2019, 2 pages.

Nokia, et al., "Discussion on RRC Connection Re-establishment procedure," SA WG2 Meeting #135,S2-1909448, Oct. 14-18, 2019, Split, Croatia, 2 pages.

Qualcomm Incorporated, "Discussion on System aspects of Connection Reestablishment for Control Plane for NB-IoT," SA WG2 Meeting #135, S2-1909912, Oct. 14-18, 2019, Split, Croatia, 3 pages.

Qualcomm Incorporated, "Handling RRC connection reestablishment for Control Plane for NB-IoT connected to 5GC," SA WG2 Meeting #135, S2-1909913, Oct. 14-18, 2019, Split, Croatia, 3 pages.

SA2, "Reply LS on RRC Connection Re-Establishment for CP for NB-IoT connected to 5GC," SA WG2 Meeting #135, S2-1909914, Oct. 14-18, 2019, Split, Croatia, 2 pages.

"Reply LS on RRC Connection Reestablishment for CP for NB-IoT connected to 5GC," 3GPP TSG SA WG2 Meeting #135,S2-1910487, Split, Croatia, Oct. 14-18, 2019, 2 pages.

Huawei, et al., "Introduction of RRC Connection Re-Establishment for CP," 3GPP TSG-WG SA2 Meeting #135, S2-1910766, Split, Croatia, Oct. 14-18, 2019, 2 pages.

Huawei, et al "Address EN in key issue 13 and solution 20," 3GPP Draft; S3-193102, Aug. 29, 2019, XP051760495, 5 pages.

* cited by examiner

METHOD FOR PROTECTING TRUNCATED PARAMETER AND APPARATUS

CROSS-REFERENCE TO RELATED APPLICATIONS

This is a continuation of International Patent Application No. PCT/CN2019/116867 filed on Nov. 8, 2019, the disclosure of which is hereby incorporated by reference in its entirety.

TECHNICAL FIELD

This disclosure relates to the field of communications technologies, and in particular, to a method for protecting a truncated parameter and an apparatus.

BACKGROUND

In some procedures (for example, a reestablishment procedure), a terminal sends, to an access network device, a Radio Resource Control (RRC) message that carries a 5th generation (5G)-system architecture evolution-temporary mobile subscriber identity (TMSI) (S-TMSI), so that the access network device can determine a specific access and mobility management function (AMF) based on the 5G-S-TMSI.

However, because the RRC message has a limited length, the RRC message may not carry the complete 5G-S-TMSI. In this case, the terminal needs to truncate the 5G-S-TMSI by using a truncated parameter, and then report a truncated 5G-S-TMSI to the access network device by using the RRC message. After receiving a parameter that is obtained after truncation (for example, the truncated 5G-S-TMSI), the access network device restores the parameter that is obtained after the truncation to a complete parameter (for example, the complete 5G-S-TMSI).

In another similar scenario, the terminal may also need to truncate some other specific parameters, and perform a similar operation described above.

The truncated parameter used by the terminal is usually configured by a network side. An access stratum (AS) security context is not established between the access network device and a terminal that uses a control plane cellular Internet of things (CIoT) 5th generation system (5GS) optimization function. Therefore, the access network device cannot perform AS security protection on the truncated parameter, and the access network device can only send a truncated parameter without AS security protection to the terminal. In this case, the truncated parameter may be tampered with by an attacker. When the truncated parameter is tampered with, the terminal cannot obtain the correct truncated parameter. As a result, the terminal cannot access a network.

SUMMARY

This disclosure provides a method for protecting a truncated parameter and an apparatus, to reduce a security risk of a truncated parameter in a transmission process.

According to a first aspect, a method for protecting a truncated parameter is provided, and includes that a mobility management network element determines whether a terminal meets a preset condition, where the preset condition includes that the terminal uses a control plane CIoT 5GS optimization function. The mobility management network element sends, to the terminal when the terminal meets the preset condition, a downlink non-AS (NAS) message on which NAS security protection is performed by using a NAS security context, where the downlink NAS message includes a truncated parameter, and the truncated parameter is used to truncate a 5G-S-TMSI of the terminal.

Based on the technical solution in this disclosure, when the terminal meets the preset condition, the terminal uses the control plane CIoT 5GS optimization function. Therefore, the mobility management network element sends, to the terminal, the downlink NAS message on which the NAS security protection is performed by using the NAS security context, so that the terminal obtains the truncated parameter on which the NAS security protection is performed. In this way, it is ensured that the truncated parameter received by the terminal is not tampered with or forged, thereby avoiding a denial of service attack launched by an attacker against the terminal, and further ensuring that the terminal can normally access a network.

In a possible design, the truncated parameter is pre-stored in the mobility management network element. In this way, the mobility management network element does not need to obtain the truncated parameter from another device (for example, an access network device), thereby simplifying a procedure.

In a possible design, the method further includes that the mobility management network element receives the truncated parameter sent by an access network device. It may be understood that the mobility management network element obtains the truncated parameter from the access network device. Therefore, the mobility management network element does not need to pre-configure the truncated parameter, thereby reducing configuration complexity of the truncated parameter.

In a possible design, that a mobility management network element determines whether a terminal meets a preset condition includes that the mobility management network element determines whether the terminal uses the control plane CIoT 5GS optimization function. If the terminal uses the control plane CIoT 5GS optimization function, the mobility management network element determines that the terminal meets the preset condition, or if the terminal does not use the control plane CIoT 5GS optimization function, the mobility management network element determines that the terminal does not meet the preset condition.

In a possible design, the preset condition further includes that the terminal is initially registered with a network. That a mobility management network element determines whether a terminal meets a preset condition includes that the mobility management network element determines whether the terminal uses the control plane CIoT 5GS optimization function and whether the terminal is initially registered with the network. If the terminal uses the control plane CIoT 5GS optimization function and the terminal is initially registered with the network, the mobility management network element determines that the terminal meets the preset condition, or if the terminal does not use the control plane CIoT 5GS optimization function or the terminal is not initially registered with the network, the mobility management network element determines that the terminal does not meet the preset condition.

In a possible design, that the mobility management network element determines whether the terminal is initially registered with the network includes that the mobility management network element determines, based on a registration type reported by the terminal, that the terminal is initially registered with the network.

In a possible design, the preset condition further includes that the terminal needs to update the truncated parameter. That a mobility management network element determines whether a terminal meets a preset condition includes that the mobility management network element determines whether the terminal uses the control plane CIoT 5GS optimization function and whether the terminal needs to update the truncated parameter. If the terminal uses the control plane CIoT 5GS optimization function and the terminal needs to update the truncated parameter, the mobility management network element determines that the terminal meets the preset condition, or if the terminal does not use the control plane CIoT 5GS optimization function or the terminal does not need to update the truncated parameter, the mobility management network element determines that the terminal does not meet the preset condition.

In a possible design, that the mobility management network element determines whether the terminal needs to update the truncated parameter includes, when a truncated parameter configured in the mobility management network element is different from the truncated parameter that is stored in a context of the terminal, the mobility management network element determines that the terminal needs to update the truncated parameter.

In a possible design, that the mobility management network element determines whether the terminal needs to update the truncated parameter includes that after the mobility management network element updates the truncated parameter, the mobility management network element determines that the terminal needs to update the truncated parameter. In a possible design, that the mobility management network element determines whether the terminal uses the control plane CIoT 5GS optimization function includes, if a preferred network behavior reported by the terminal indicates that the terminal prefers to use the control plane CIoT 5GS optimization function, and the mobility management network element supports the control plane CIoT 5GS optimization function, the mobility management network element determines that the terminal uses the control plane CIoT 5GS optimization function.

In a possible design, that the mobility management network element determines whether the terminal uses the control plane CIoT 5GS optimization function includes, if the context of the terminal indicates that the terminal uses the control plane CIoT 5GS optimization function, the mobility management network element determines that the terminal uses the control plane CIoT 5GS optimization function.

In a possible design, that a mobility management network element determines whether a terminal meets a preset condition includes that after the mobility management network element receives a registration request message or a service request message of the terminal, the mobility management network element determines whether the terminal meets the preset condition.

In a possible design, the downlink NAS message is a service accept message or a registration accept message.

In a possible design, the first bit to the tenth bit of the 5G-S-TMSI are used to indicate an AMF set identifier (ID), the eleventh bit to the sixteenth bit of the 5G-S-TMSI are used to indicate an AMF pointer, and the seventeenth bit to the forty-eighth bit of the 5G-S-TMSI are used to indicate a 5G-TMSI. The truncated parameter includes a first truncated parameter and a second truncated parameter, the first truncated parameter is used to truncate the AMF set ID and the 5G-TMSI, and the second truncated parameter is used to truncate the AMF pointer and the 5G-TMSI.

In a possible design, the method further includes that the mobility management network element updates the truncated parameter based on a quantity of AMF set IDs and/or a quantity of AMF pointers. Alternatively, the mobility management network element updates the truncated parameter according to an instruction of a network management system. Alternatively, the mobility management network element receives an updated truncated parameter sent by the access network device.

According to a second aspect, a method for protecting a truncated parameter is provided, and includes that a terminal receives a downlink NAS message that is sent by a mobility management network element and on which NAS security protection is performed by using a NAS security context, where the downlink NAS message includes a truncated parameter, and the truncated parameter is used to truncate a 5G-S-TMSI of the terminal. The terminal performs security deprotection on the downlink NAS message. The terminal stores the truncated parameter after successfully performing security deprotection on the downlink NAS message.

Based on the technical solution in this disclosure, because the truncated parameter is carried in the downlink NAS message on which the NAS security protection is performed, the truncated parameter is also under the NAS security protection. In this way, it is ensured that the truncated parameter is not tampered with or forged, thereby avoiding a denial of service attack launched by an attacker against the terminal, and further ensuring that the terminal can normally access a network.

In a possible design, that the terminal stores the truncated parameter includes that a NAS layer of the terminal stores the truncated parameter.

In a possible design, the method further includes that the NAS layer of the terminal sends the truncated parameter to an RRC layer of the terminal. The RRC layer of the terminal truncates the 5G-S-TMSI of the terminal based on the truncated parameter, to obtain a truncated 5G-S-TMSI.

In a possible design, the method further includes that the NAS layer of the terminal truncates the 5G-S-TMSI of the terminal based on the truncated parameter, to obtain a truncated 5G-S-TMSI. The NAS layer of the terminal sends the truncated 5G-S-TMSI to an RRC layer of the terminal.

In a possible design, that the terminal stores the truncated parameter includes that a NAS layer of the terminal sends the truncated parameter to an RRC layer of the terminal. The RRC layer of the terminal stores the truncated parameter.

In a possible design, the method further includes that the RRC layer of the terminal truncates the 5G-S-TMSI of the terminal based on the truncated parameter, to obtain a truncated 5G-S-TMSI.

In a possible design, the method further includes that the RRC layer of the terminal sends the truncated parameter to the NAS layer of the terminal. The NAS layer of the terminal truncates the 5G-S-TMSI of the terminal based on the truncated parameter, to obtain a truncated 5G-S-TMSI. The NAS layer of the terminal sends the truncated 5G-S-TMSI to the RRC layer of the terminal.

In a possible design, the method further includes that the terminal sends an RRC reestablishment request message to an access network device, where the RRC reestablishment request message includes the truncated 5G-S-TMSI.

In a possible design, the downlink NAS message is a service accept message or a registration accept message.

In a possible design, the first bit to the tenth bit of the 5G-S-TMSI are used to indicate an AMF set ID, the eleventh bit to the sixteenth bit of the 5G-S-TMSI are used to indicate an AMF pointer, and the seventeenth bit to the forty-eighth bit of the 5G-S-TMSI are used to indicate a 5G-TMSI. The truncated parameter includes a first truncated parameter and a second truncated parameter, the first truncated parameter is used to truncate the AMF set ID and the 5G-TMSI, and the second truncated parameter is used to truncate the AMF pointer and the 5G-TMSI.

According to a third aspect, a method for protecting a truncated parameter is provided, and includes that an access network device determines whether a terminal supports a CIoT 5GS optimization feature. The access network device sends a truncated parameter to a mobility management network element when the terminal supports the CIoT 5GS optimization feature, where the truncated parameter is used to truncate a 5G-S-TMSI of the terminal.

Based on the technical solution in this disclosure, the access network device sends the truncated parameter to the mobility management network element when the terminal supports the CIoT 5GS optimization feature, so that the mobility management network element performs NAS security protection on the truncated parameter. In this way, the access network device is prevented from directly sending the truncated parameter with no security protection to the terminal, and a security risk of the truncated parameter in a transmission process is reduced.

In a possible design, that an access network device determines whether a terminal supports a CIoT 5GS optimization feature includes, if capability indication information of the terminal is used to indicate that the terminal supports the CIoT 5GS optimization feature, the access network device determines that the terminal supports the CIoT 5GS optimization feature.

In a possible design, that an access network device determines whether a terminal supports a CIoT 5GS optimization feature includes, if a frequency used by the terminal is the same as a frequency used by a CIoT device, the access network device determines that the terminal supports the CIoT 5GS optimization feature.

In a possible design, that an access network device determines whether a terminal supports a CIoT 5GS optimization feature includes, if a type of a message sent by the terminal is the same as a type of a message sent by a CIoT device, the access network device determines that the terminal supports the CIoT 5GS optimization feature.

In a possible design, that an access network device determines whether a terminal supports a CIoT 5GS optimization feature includes that after the access network device receives an uplink RRC message sent by the terminal, the access network device determines whether the terminal supports the CIoT 5GS optimization feature.

In a possible design, the uplink RRC message is an RRC establishment request message or an RRC establishment complete message.

In a possible design, that the access network device sends a truncated parameter to a mobility management network element includes that the access network device sends an initial user equipment (UE) message to the mobility management network element, where the initial UE message includes the truncated parameter.

In a possible design, the truncated parameter is pre-stored in the access network device.

In a possible design, the method further includes that the access network device receives an RRC reestablishment request message sent by the terminal, where the RRC reestablishment request message includes a truncated 5G-S-TMSI.

In a possible design, the first bit to the tenth bit of the 5G-S-TMSI are used to indicate an AMF set ID, the eleventh bit to the sixteenth bit of the 5G-S-TMSI are used to indicate an AMF pointer, and the seventeenth bit to the forty-eighth bit of the 5G-S-TMSI are used to indicate a 5G-TMSI. The truncated parameter includes a first truncated parameter and a second truncated parameter, the first truncated parameter is used to truncate the AMF set ID and the 5G-TMSI, and the second truncated parameter is used to truncate the AMF pointer and the 5G-TMSI.

According to a fourth aspect, a method for protecting a truncated parameter is provided, and includes that a mobility management network element updates a truncated parameter, where the truncated parameter is used to truncate a 5G-S-TMSI. The mobility management network element searches for a terminal that uses a control plane CIoT 5GS optimization function. The mobility management network element sends, to the terminal that uses the control plane CIoT 5GS optimization function, a downlink NAS message on which NAS security protection is performed by using a NAS security context, where the downlink NAS message includes an updated truncated parameter.

Based on the technical solution in this disclosure, in a scenario in which the mobility management network element updates the truncated parameter, the mobility management network element sends, to the terminal that uses the control plane CIoT 5GS optimization function, the downlink NAS message on which the NAS security protection is performed by using the NAS security context. Because the updated truncated parameter is carried in the downlink NAS message, the updated truncated parameter is not tampered with or forged by an attacker during transmission over an air interface. In this way, the terminal that uses the control plane CIoT 5GS optimization function can obtain the correct updated truncated parameter in a timely manner, to ensure that the terminal that uses the control plane CIoT 5GS optimization function can normally access a network.

In a possible design, that a mobility management network element updates a truncated parameter includes that the mobility management network element updates the truncated parameter based on a quantity of AMF set IDs and/or a quantity of AMF pointers. Alternatively, the mobility management network element updates the truncated parameter according to an instruction of a network management system. Alternatively, the mobility management network element receives the updated truncated parameter sent by an access network device.

In a possible design, that the mobility management network element sends, to the terminal that uses the control plane CIoT 5GS optimization function, a downlink NAS message on which NAS security protection is performed by using a NAS security context includes, when the terminal that uses the control plane CIoT 5GS optimization function is in a connected state, the mobility management network element sends the downlink NAS message to the terminal that uses the control plane CIoT 5GS optimization function.

In a possible design, that the mobility management network element sends, to the terminal that uses the control plane CIoT 5GS optimization function, a downlink NAS message on which NAS security protection is performed by using a NAS security context includes, when the terminal that uses the control plane CIoT 5GS optimization function is in a non-connected state, the mobility management network element waits for the terminal that uses the control plane CIoT 5GS optimization function to enter a connected state. After the terminal that uses the control plane CIoT 5GS optimization function enters the connected state, and the mobility management network element and the terminal that uses the control plane CIoT 5GS optimization function activate NAS security, the mobility management network element sends the downlink NAS message to the terminal that uses the control plane CIoT 5GS optimization function.

In a possible design, that the mobility management network element sends, to the terminal that uses the control plane CIoT 5GS optimization function, a downlink NAS message on which NAS security protection is performed by using a NAS security context includes, when the terminal that uses the control plane CIoT 5GS optimization function is in a non-connected state, the mobility management network element triggers, through paging, the terminal that uses the control plane CIoT 5GS optimization function to enter a connected state. After the terminal that uses the control plane CIoT 5GS optimization function enters the connected state, and the mobility management network element and the terminal that uses the control plane CIoT 5GS optimization function activate NAS security, the mobility management network element sends the downlink NAS message to the terminal that uses the control plane CIoT 5GS optimization function.

In a possible design, the downlink NAS message is a UE configuration update command message or a service accept message.

In a possible design, the first bit to the tenth bit of the 5G-S-TMSI are used to indicate an AMF set ID, the eleventh bit to the sixteenth bit of the 5G-S-TMSI are used to indicate an AMF pointer, and the seventeenth bit to the forty-eighth bit of the 5G-S-TMSI are used to indicate a 5G-TMSI. The truncated parameter includes a first truncated parameter and a second truncated parameter, the first truncated parameter is used to truncate the AMF set ID and the 5G-TMSI, and the second truncated parameter is used to truncate the AMF pointer and the 5G-TMSI.

According to a fifth aspect, a method for protecting a truncated parameter is provided, and includes that a mobility management network element receives a truncated parameter sent by an access network device, where the truncated parameter is used to truncate a 5G-S-TMSI of a terminal. The mobility management network element performs integrity calculation on the 5G-S-TMSI of the terminal based on a NAS security context of the terminal, to generate a first NAS message authentication code (MAC). The mobility management network element sends the first NAS MAC to the access network device.

Based on the technical solution in this disclosure, the mobility management network element performs integrity calculation on the truncated parameter to obtain the first NAS MAC, and sends the first NAS MAC to the access network device. In this way, the access network device may send the first NAS MAC and the truncated parameter to the terminal, to ensure that the truncated parameter is not tampered with or forged by an attacker in a transmission process, thereby reducing a security risk of the truncated parameter in the transmission process.

In a possible design, the method further includes that the mobility management network element receives protection indication information and/or a freshness parameter sent by the access network device, where the protection indication information is used to indicate the mobility management network element to perform security protection on the truncated parameter, and the freshness parameter is used to perform integrity calculation on the truncated parameter.

In a possible design, the first bit to the tenth bit of the 5G-S-TMSI are used to indicate an AMF set ID, the eleventh bit to the sixteenth bit of the 5G-S-TMSI are used to indicate an AMF pointer, and the seventeenth bit to the forty-eighth bit of the 5G-S-TMSI are used to indicate a 5G-TMSI. The truncated parameter includes a first truncated parameter and a second truncated parameter, the first truncated parameter is used to truncate the AMF set ID and the 5G-TMSI, and the second truncated parameter is used to truncate the AMF pointer and the 5G-TMSI.

According to a sixth aspect, a method for protecting a truncated parameter is provided, and includes that an access network device sends a truncated parameter to a mobility management network element, where the truncated parameter is used to truncate a 5G-S-TMSI of a terminal. The access network device receives a first NAS MAC sent by the mobility management network element, where the first NAS MAC is obtained by performing integrity calculation on the truncated parameter. The access network device sends the first NAS MAC and the truncated parameter to the terminal.

Based on the technical solution in this disclosure, the access network device may send the first NAS MAC and the truncated parameter to the terminal, to ensure that the truncated parameter is not tampered with or forged by an attacker in a transmission process, thereby reducing a security risk of the truncated parameter in the transmission process.

In a possible design, the method further includes that the access network device determines whether the terminal supports a CIoT 5GS optimization feature. That an access network device sends a truncated parameter to a mobility management network element includes that the access network device sends the truncated parameter to the mobility management network element when the terminal supports the CIoT 5GS optimization feature.

In a possible design, that the access network device determines whether the terminal supports a CIoT 5GS optimization feature includes, if capability indication information of the terminal is used to indicate that the terminal supports the CIoT 5GS optimization feature, the access network device determines that the terminal supports the CIoT 5GS optimization feature.

In a possible design, that the access network device determines whether the terminal supports a CIoT 5GS optimization feature includes, if a frequency used by the terminal is the same as a frequency used by a CIoT device, the access network device determines that the terminal supports the CIoT 5GS optimization feature.

In a possible design, that the access network device determines whether the terminal supports a CIoT 5GS optimization feature includes, if a type of a message sent by the terminal is the same as a type of a message sent by a CIoT device, the access network device determines that the terminal supports the CIoT 5GS optimization feature.

In a possible design, that the access network device determines whether the terminal supports a CIoT 5GS optimization feature includes that after the access network device receives an uplink RRC message sent by the terminal, the access network device determines whether the terminal supports the CIoT 5GS optimization feature.

In a possible design, the uplink RRC message is an RRC establishment request message or an RRC establishment complete message.

In a possible design, the method further includes that the access network device sends protection indication information and/or a freshness parameter to the mobility management network element, where the protection indication information is used to indicate the mobility management network element to perform security protection on the truncated parameter, and the freshness parameter is used to perform integrity calculation on the truncated parameter.

In a possible design, the method further includes that the access network device receives an RRC reestablishment request message sent by the terminal, where the RRC reestablishment request message includes a truncated 5G-S-TMSI.

In a possible design, the first bit to the tenth bit of the 5G-S-TMSI are used to indicate an AMF set ID, the eleventh bit to the sixteenth bit of the 5G-S-TMSI are used to indicate an AMF pointer, and the seventeenth bit to the forty-eighth bit of the 5G-S-TMSI are used to indicate a 5G-TMSI. The truncated parameter includes a first truncated parameter and a second truncated parameter, the first truncated parameter is used to truncate the AMF set ID and the 5G-TMSI, and the second truncated parameter is used to truncate the AMF pointer and the 5G-TMSI.

According to a seventh aspect, a method for protecting a truncated parameter is provided, and includes that a terminal receives a first NAS MAC and a truncated parameter that are sent by an access network device, where the truncated parameter is used to truncate a 5G-S-TMSI of the terminal. The terminal performs integrity calculation on the truncated parameter based on a NAS security context, to generate a second NAS MAC. The terminal checks the first NAS MAC based on the second NAS MAC. The terminal stores the truncated parameter if the check on the first NAS MAC succeeds.

Based on the technical solution in this disclosure, because the terminal receives the first NAS MAC and the truncated parameter, the terminal can verify integrity of the truncated parameter by checking the first NAS MAC. When determining that the truncated parameter is not tampered with or forged, the terminal stores the truncated parameter, to truncate the 5G-S-TMSI based on the truncated parameter in a subsequent process.

In a possible design, that the terminal stores the truncated parameter includes that an RRC layer of the terminal stores the truncated parameter.

In a possible design, the method further includes that the RRC layer of the terminal truncates the 5G-S-TMSI of the terminal based on the truncated parameter, to obtain a truncated 5G-S-TMSI.

In a possible design, the method further includes that the RRC layer of the terminal sends the truncated parameter to a NAS layer of the terminal. The NAS layer of the terminal truncates the 5G-S-TMSI of the terminal based on the truncated parameter, to obtain a truncated 5G-S-TMSI. The NAS layer of the terminal sends the truncated 5G-S-TMSI to the RRC layer of the terminal.

In a possible design, that the terminal stores the truncated parameter includes that an RRC layer of the terminal sends the truncated parameter to a NAS layer of the terminal. The NAS layer of the terminal stores the truncated parameter.

In a possible design, the method further includes that the NAS layer of the terminal truncates the 5G-S-TMSI of the terminal based on the truncated parameter, to obtain a truncated 5G-S-TMSI. The NAS layer of the terminal sends the truncated 5G-S-TMSI to the RRC layer of the terminal.

In a possible design, the method further includes that the NAS layer of the terminal sends the truncated parameter to the RRC layer of the terminal. The RRC layer of the terminal truncates the 5G-S-TMSI of the terminal based on the truncated parameter, to obtain a truncated 5G-S-TMSI.

In a possible design, the method further includes that the terminal sends an RRC reestablishment request message to the access network device, where the RRC reestablishment request message includes the truncated 5G-S-TMSI.

In a possible design, the first bit to the tenth bit of the 5G-S-TMSI are used to indicate an AMF set ID, the eleventh bit to the sixteenth bit of the 5G-S-TMSI are used to indicate an AMF pointer, and the seventeenth bit to the forty-eighth bit of the 5G-S-TMSI are used to indicate a 5G-TMSI. The truncated parameter includes a first truncated parameter and a second truncated parameter, the first truncated parameter is used to truncate the AMF set ID and the 5G-TMSI, and the second truncated parameter is used to truncate the AMF pointer and the 5G-TMSI.

According to an eighth aspect, a communications apparatus is provided, and includes that a processing module configured to determine whether a terminal meets a preset condition, where the preset condition includes that the terminal uses a control plane CIoT 5GS optimization function, and a communications module configured to send, to the terminal when the terminal meets the preset condition, a downlink NAS message on which NAS security protection is performed by using a NAS security context, where the downlink NAS message includes a truncated parameter, and the truncated parameter is used to truncate a 5G-S-TMSI of the terminal.

In a possible design, the communications apparatus further includes a storage module, and the storage module is configured to store the truncated parameter.

In a possible design, the communications module is further configured to receive the truncated parameter sent by an access network device.

In a possible design, that the processing module is configured to determine whether the terminal meets the preset condition includes determining whether the terminal uses the control plane CIoT 5GS optimization function, and if the terminal uses the control plane CIoT 5GS optimization function, determining that the terminal meets the preset condition, or if the terminal does not use the control plane CIoT 5GS optimization function, determining that the terminal does not meet the preset condition.

In a possible design, the preset condition further includes that the terminal is initially registered with a network. That the processing module is configured to determine whether the terminal meets the preset condition includes determining whether the terminal uses the control plane CIoT 5GS optimization function and whether the terminal is initially registered with the network, and if the terminal uses the control plane CIoT 5GS optimization function and the terminal is initially registered with the network, determining that the terminal meets the preset condition, or if the terminal does not use the control plane CIoT 5GS optimization function or the terminal is not initially registered with the network, determining that the terminal does not meet the preset condition.

In a possible design, the processing module is further configured to determine, based on a registration type reported by the terminal, that the terminal is initially registered with the network.

In a possible design, the preset condition further includes that the terminal needs to update the truncated parameter. That the processing module is configured to determine whether the terminal meets the preset condition includes determining whether the terminal uses the control plane CIoT 5GS optimization function and whether the terminal needs to update the truncated parameter, and if the terminal uses the control plane CIoT 5GS optimization function and the terminal needs to update the truncated parameter, determining that the terminal meets the preset condition, or if the terminal does not use the control plane CIoT 5GS optimization function or the terminal does not need to update the truncated parameter, determining that the terminal does not meet the preset condition.

In a possible design, the processing module is further configured to, when a truncated parameter configured in a mobility management network element is different from the truncated parameter that is stored in a context of the terminal, determine that the terminal needs to update the truncated parameter.

In a possible design, the processing module is further configured to, after the mobility management network element updates the truncated parameter, determine that the terminal needs to update the truncated parameter.

In a possible design, the processing module is further configured to update the truncated parameter based on a quantity of AMF set IDs and/or a quantity of AMF pointers, or update the truncated parameter according to an instruction of a network management system, or receive the updated truncated parameter sent by an access network device.

In a possible design, the processing module is further configured to, if a preferred network behavior reported by the terminal indicates that the terminal prefers to use the control plane CIoT 5GS optimization function, and the mobility management network element supports the control plane CIoT 5GS optimization function, determine that the terminal uses the control plane CIoT 5GS optimization function.

In a possible design, the processing module is further configured to, if the context of the terminal indicates that the terminal uses the control plane CIoT 5GS optimization function, determine that the terminal uses the control plane CIoT 5GS optimization function.

In a possible design, the processing module is further configured to, after the communications module receives a registration request message or a service request message of the terminal, determine whether the terminal meets the preset condition.

In a possible design, the downlink NAS message is a service accept message or a registration accept message.

In a possible design, the first bit to the tenth bit of the 5G-S-TMSI are used to indicate an AMF set ID, the eleventh bit to the sixteenth bit of the 5G-S-TMSI are used to indicate an AMF pointer, and the seventeenth bit to the forty-eighth bit of the 5G-S-TMSI are used to indicate a 5G-TMSI. The truncated parameter includes a first truncated parameter and a second truncated parameter, the first truncated parameter is used to truncate the AMF set ID and the 5G-TMSI, and the second truncated parameter is used to truncate the AMF pointer and the 5G-TMSI.

In a possible design, the processing module is configured to update the truncated parameter based on a quantity of AMF set IDs and/or a quantity of AMF pointers.

In a possible design, the processing module is configured to update the truncated parameter according to an instruction of a network management system.

In a possible design, the communications module is further configured to receive an updated truncated parameter sent by the access network device.

According to a ninth aspect, a communications apparatus is provided, and includes that a communications module configured to receive a downlink NAS message that is sent by a mobility management network element and on which NAS security protection is performed by using a NAS security context, where the downlink NAS message includes a truncated parameter, and the truncated parameter is used to truncate a 5G-S-TMSI of a terminal, a processing module configured to perform security deprotection on the downlink NAS message, and a storage module configured to store the truncated parameter after the processing module successfully performs security deprotection on the downlink NAS message.

In a possible design, the storage module is configured to store the truncated parameter, including storing, by a NAS layer, the truncated parameter.

In a possible design, the processing module is further configured to obtain a truncated 5G-S-TMSI, including sending, by the NAS layer, the truncated parameter to an RRC layer, and truncating, by the RRC layer, the 5G-S-TMSI of the terminal based on the truncated parameter, to obtain the truncated 5G-S-TMSI.

In a possible design, the processing module is further configured to obtain a truncated 5G-S-TMSI, including truncating, by the NAS layer, the 5G-S-TMSI of the terminal based on the truncated parameter, to obtain the truncated 5G-S-TMSI, and sending, by the NAS layer, the truncated 5G-S-TMSI to an RRC layer.

In a possible design, the storage module is configured to store the truncated parameter, including sending, by a NAS layer, the truncated parameter to an RRC layer, and storing, by the RRC layer, the truncated parameter.

In a possible design, the processing module is further configured to obtain a truncated 5G-S-TMSI, including truncating, by the RRC layer, the 5G-S-TMSI of the terminal based on the truncated parameter, to obtain the truncated 5G-S-TMSI.

In a possible design, the processing module is further configured to obtain a truncated 5G-S-TMSI, including sending, by the RRC layer, the truncated parameter to the NAS layer, truncating, by the NAS layer, the 5G-S-TMSI of the terminal based on the truncated parameter, to obtain the truncated 5G-S-TMSI, and sending, by the NAS layer, the truncated 5G-S-TMSI to the RRC layer.

In a possible design, the downlink NAS message is a service accept message or a registration accept message.

In a possible design, the first bit to the tenth bit of the 5G-S-TMSI are used to indicate an AMF set ID, the eleventh bit to the sixteenth bit of the 5G-S-TMSI are used to indicate an AMF pointer, and the seventeenth bit to the forty-eighth bit of the 5G-S-TMSI are used to indicate a 5G-TMSI. The truncated parameter includes a first truncated parameter and a second truncated parameter, the first truncated parameter is used to truncate the AMF set ID and the 5G-TMSI, and the second truncated parameter is used to truncate the AMF pointer and the 5G-TMSI.

In a possible design, the communications module is further configured to send an RRC reestablishment request message to an access network device, where the RRC reestablishment request message includes the truncated 5G-S-TMSI.

According to a tenth aspect, a communications apparatus is provided, and includes that a processing module configured to determine whether a terminal supports a CIoT 5GS optimization feature, and a communications module configured to send a truncated parameter to a mobility management network element when the terminal supports the CIoT 5GS optimization feature, where the truncated parameter is used to truncate a 5G-S-TMSI of the terminal.

In a possible design, the processing module is further configured to, if capability indication information of the terminal is used to indicate that the terminal supports the CIoT 5GS optimization feature, determine that the terminal supports the CIoT 5GS optimization feature.

In a possible design, the processing module is further configured to, if a frequency used by the terminal is the same as a frequency used by a CIoT device, determine that the terminal supports the CIoT 5GS optimization feature.

In a possible design, the processing module is further configured to, if a type of a message sent by the terminal is the same as a type of a message sent by a CIoT device, determine that the terminal supports the CIoT 5GS optimization feature.

In a possible design, the processing module is further configured to, after the communications module receives an uplink RRC message sent by the terminal, determine whether the terminal supports the CIoT 5GS optimization feature.

In a possible design, the uplink RRC message is an RRC establishment request message or an RRC establishment complete message.

In a possible design, the communications module is further configured to send an initial UE message to the mobility management network element, where the initial UE message includes the truncated parameter.

In a possible design, the communications apparatus further includes a storage module, and the storage module is configured to store the truncated parameter.

In a possible design, the communications module is configured to receive an RRC reestablishment request message sent by the terminal, where the RRC reestablishment request message includes a truncated 5G-S-TMSI.

In a possible design, the first bit to the tenth bit of the 5G-S-TMSI are used to indicate an AMF set ID, the eleventh bit to the sixteenth bit of the 5G-S-TMSI are used to indicate an AMF pointer, and the seventeenth bit to the forty-eighth bit of the 5G-S-TMSI are used to indicate a 5G-TMSI. The truncated parameter includes a first truncated parameter and a second truncated parameter, the first truncated parameter is used to truncate the AMF set ID and the 5G-TMSI, and the second truncated parameter is used to truncate the AMF pointer and the 5G-TMSI.

According to an eleventh aspect, a communications apparatus is provided, and includes that a processing module configured to update a truncated parameter, where the truncated parameter is used to truncate a 5G-S-TMSI, and search for a terminal that uses a control plane CIoT 5GS optimization function, and a communications module configured to send, to the terminal that uses the control plane CIoT 5GS optimization function, a downlink NAS message on which NAS security protection is performed by using a NAS security context, where the downlink NAS message includes an updated truncated parameter.

In a possible design, the processing module is configured to update the truncated parameter based on a quantity of AMF set IDs and/or a quantity of AMF pointers, or update the truncated parameter according to an instruction of a network management system, or receive the updated truncated parameter sent by an access network device.

In a possible design, the communications module is further configured to, when the terminal that uses the control plane CIoT 5GS optimization function is in a connected state, send the downlink NAS message to the terminal that uses the control plane CIoT 5GS optimization function.

In a possible design, the communications module is further configured to, when the terminal that uses the control plane CIoT 5GS optimization function is in a non-connected state, wait for the terminal that uses the control plane CIoT 5GS optimization function to enter a connected state, and after the terminal that uses the control plane CIoT 5GS optimization function enters the connected state, and a mobility management network element and the terminal that uses the control plane CIoT 5GS optimization function activate NAS security, send the downlink NAS message to the terminal that uses the control plane CIoT 5GS optimization function.

In a possible design, the communications module is further configured to, when the terminal that uses the control plane CIoT 5GS optimization function is in a non-connected state, trigger, through paging, the terminal that uses the control plane CIoT 5GS optimization function to enter a connected state, and after the terminal that uses the control plane CIoT 5GS optimization function enters the connected state, and a mobility management network element and the terminal that uses the control plane CIoT 5GS optimization function activate NAS security, send the downlink NAS message to the terminal that uses the control plane CIoT 5GS optimization function.

In a possible design, the downlink NAS message is a UE configuration update command message or a service accept message.

In a possible design, the first bit to the tenth bit of the 5G-S-TMSI are used to indicate an AMF set ID, the eleventh bit to the sixteenth bit of the 5G-S-TMSI are used to indicate an AMF pointer, and the seventeenth bit to the forty-eighth bit of the 5G-S-TMSI are used to indicate a 5G-TMSI. The truncated parameter includes a first truncated parameter and a second truncated parameter, the first truncated parameter is used to truncate the AMF set ID and the 5G-TMSI, and the second truncated parameter is used to truncate the AMF pointer and the 5G-TMSI.

According to a twelfth aspect, a communications apparatus is provided, and includes that a communications module configured to receive a truncated parameter sent by an access network device, where the truncated parameter is used to truncate a 5G-S-TMSI of a terminal, and a processing module configured to perform integrity calculation on the 5G-S-TMSI of the terminal based on a NAS security context of the terminal, to generate a first NAS MAC, where the communications module is further configured to send the first NAS MAC to the access network device.

In a possible design, the communications module is further configured to receive protection indication information and/or a freshness parameter sent by the access network device, where the protection indication information is used to indicate a mobility management network element to perform security protection on the truncated parameter, and the freshness parameter is used to perform integrity calculation on the truncated parameter.

In a possible design, the first bit to the tenth bit of the 5G-S-TMSI are used to indicate an AMF set ID, the eleventh bit to the sixteenth bit of the 5G-S-TMSI are used to indicate an AMF pointer, and the seventeenth bit to the forty-eighth bit of the 5G-S-TMSI are used to indicate a 5G-TMSI. The truncated parameter includes a first truncated parameter and a second truncated parameter, the first truncated parameter is used to truncate the AMF set ID and the 5G-TMSI, and the second truncated parameter is used to truncate the AMF pointer and the 5G-TMSI.

According to a thirteenth aspect, a communications apparatus is provided, and includes that a communications module configured to send a truncated parameter to a mobility management network element, where the truncated parameter is used to truncate a 5G-S-TMSI of a terminal, receive a first NAS MAC sent by the mobility management network element, where the first NAS MAC is obtained by performing integrity calculation on the truncated parameter, and send the first NAS MAC and the truncated parameter to the terminal.

In a possible design, the communications apparatus further includes a processing module, the processing module is configured to determine whether the terminal supports a CIoT 5GS optimization feature, and the communications module is further configured to send the truncated parameter to the mobility management network element when the terminal supports the CIoT 5GS optimization feature.

In a possible design, the processing module is further configured to, if capability indication information of the terminal is used to indicate that the terminal supports the CIoT 5GS optimization feature, determine that the terminal supports the CIoT 5GS optimization feature.

In a possible design, the processing module is further configured to, if a frequency used by the terminal is the same as a frequency used by a CIoT device, determine that the terminal supports the CIoT 5GS optimization feature.

In a possible design, the processing module is further configured to, if a type of a message sent by the terminal is the same as a type of a message sent by a CIoT device, determine that the terminal supports the CIoT 5GS optimization feature.

In a possible design, the communications module is further configured to receive an uplink RRC message sent by the terminal, and the processing module is further configured to, after the communications module receives the uplink RRC message sent by the terminal, determine whether the terminal supports the CIoT 5GS optimization feature.

In a possible design, the uplink RRC message is an RRC establishment request message or an RRC establishment complete message.

In a possible design, the communications module is further configured to send protection indication information and/or a freshness parameter to the mobility management network element, where the protection indication information is used to indicate the mobility management network element to perform security protection on the truncated parameter, and the freshness parameter is used to perform integrity calculation on the truncated parameter.

In a possible design, the communications module is further configured to receive an RRC reestablishment request message sent by the terminal, where the RRC reestablishment request message includes a truncated 5G-S-TMSI.

In a possible design, the first bit to the tenth bit of the 5G-S-TMSI are used to indicate an AMF set ID, the eleventh bit to the sixteenth bit of the 5G-S-TMSI are used to indicate an AMF pointer, and the seventeenth bit to the forty-eighth bit of the 5G-S-TMSI are used to indicate a 5G-TMSI. The truncated parameter includes a first truncated parameter and a second truncated parameter, the first truncated parameter is used to truncate the AMF set ID and the 5G-TMSI, and the second truncated parameter is used to truncate the AMF pointer and the 5G-TMSI.

According to a fourteenth aspect, a communications apparatus is provided, and includes that a communications module configured to receive a first NAS MAC and a truncated parameter that are sent by an access network device, where the truncated parameter is used to truncate a 5G-S-TMSI of a terminal, a processing module configured to perform integrity calculation on the truncated parameter based on a NAS security context, to generate a second NAS MAC, and check the first NAS MAC based on the second NAS MAC, and a storage module configured to store the truncated parameter if the check on the first NAS MAC succeeds.

In a possible design, the storage module is configured to store the truncated parameter, including storing, by an RRC layer, the truncated parameter.

In a possible design, the processing module is further configured to obtain a truncated 5G-S-TMSI, including truncating, by the RRC layer, the 5G-S-TMSI of the terminal based on the truncated parameter, to obtain the truncated 5G-S-TMSI.

In a possible design, the processing module is further configured to obtain a truncated 5G-S-TMSI, including sending, by the RRC layer, the truncated parameter to a NAS layer, truncating, by the NAS layer, the 5G-S-TMSI of the terminal based on the truncated parameter, to obtain the truncated 5G-S-TMSI, and sending, by the NAS layer, the truncated 5G-S-TMSI to the RRC layer.

In a possible design, the storage module is configured to store the truncated parameter, including sending, by an RRC layer, the truncated parameter to a NAS layer, and storing, by the NAS layer, the truncated parameter.

In a possible design, the processing module is further configured to obtain a truncated 5G-S-TMSI, including truncating, by the NAS layer, the 5G-S-TMSI of the terminal based on the truncated parameter, to obtain the truncated 5G-S-TMSI, and sending, by the NAS layer, the truncated 5G-S-TMSI to the RRC layer.

In a possible design, the processing module is further configured to obtain a truncated 5G-S-TMSI, including sending, by the NAS layer, the truncated parameter to the RRC layer, and truncating, by the RRC layer, the 5G-S-TMSI of the terminal based on the truncated parameter, to obtain the truncated 5G-S-TMSI.

In a possible design, the communications module is further configured to send an RRC reestablishment request message to the access network device, where the RRC reestablishment request message includes the truncated 5G-S-TMSI.

In a possible design, the first bit to the tenth bit of the 5G-S-TMSI are used to indicate an AMF set ID, the eleventh bit to the sixteenth bit of the 5G-S-TMSI are used to indicate an AMF pointer, and the seventeenth bit to the forty-eighth bit of the 5G-S-TMSI are used to indicate a 5G-TMSI. The truncated parameter includes a first truncated parameter and a second truncated parameter, the first truncated parameter is used to truncate the AMF set ID and the 5G-TMSI, and the second truncated parameter is used to truncate the AMF pointer and the 5G-TMSI.

According to a fifteenth aspect, a communications apparatus is provided, and includes a processor and a communications interface. The processor is configured to execute a computer program instruction, so that the communications apparatus implements the method for protecting a truncated parameter in any design provided in any one of the first aspect to the seventh aspect.

According to a sixteenth aspect, a computer-readable storage medium is provided. The computer-readable storage medium stores an instruction, and when the instruction is run on a computer, the computer is enabled to implement the method for protecting a truncated parameter in any design provided in any one of the first aspect to the seventh aspect.

According to a seventeenth aspect, a computer program product is provided. The computer program product includes an instruction, and when the computer program product runs on a computer, the computer is enabled to implement the method for protecting a truncated parameter in any design provided in any one of the first aspect to the seventh aspect.

According to an eighteenth aspect, a chip is provided. The chip includes a processor, and when the processor executes a computer program instruction, the chip is enabled to implement the method for protecting a truncated parameter in any design of the first aspect to the seventh aspect.

According to a nineteenth aspect, a communications system is provided. The communications system includes a mobility management network element and an access network device. The mobility management network element is configured to perform the method for protecting a truncated parameter in any design of the first aspect. The access network device is configured to perform the method for protecting a truncated parameter in any design of the third aspect.

According to a twentieth aspect, a communications system is provided. The communications system includes a mobility management network element and an access network device. The mobility management network element is configured to perform the method for protecting a truncated parameter in any design of the fifth aspect. The access network device is configured to perform the method for protecting a truncated parameter in any design of the sixth aspect.

DESCRIPTION OF EMBODIMENTS

Figure 1:
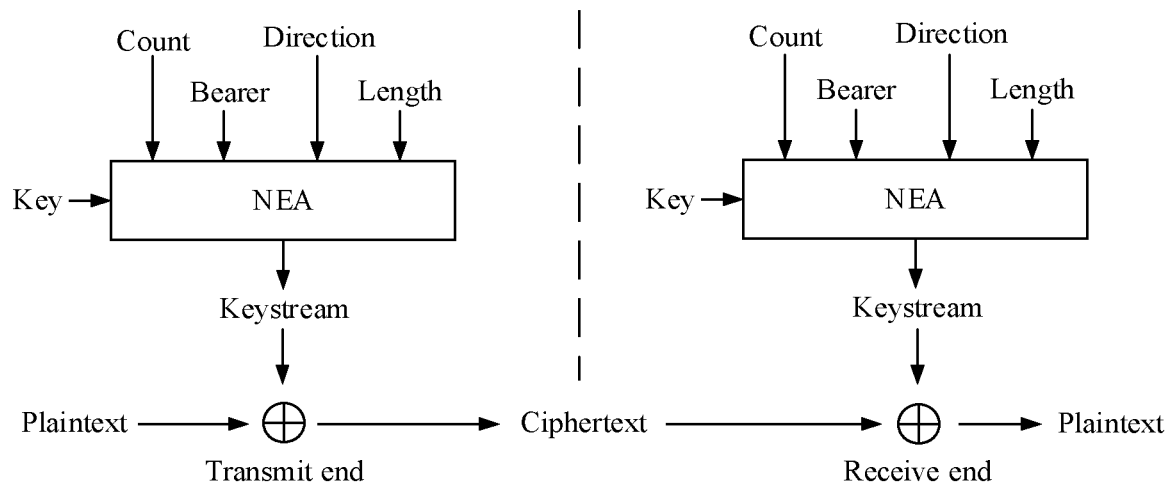
FIG. 1 is a schematic diagram of an encryption/decryption process.

In the description of this disclosure, unless otherwise specified, "/" means "or". For example, A/B may represent A or B. The term "and/or" in this specification describes only an association relationship for associated objects and represents that three relationships may exist. For example, A and/or B may represent the following three cases: only A exists, both A and B exist, and only B exists. In addition, "at least one" means one or more, and "a plurality of" means two or more. Words such as "first" and "second" do not limit a quantity and an execution sequence, and the words such as "first" and "second" do not indicate a definite difference.

It should be noted that in this disclosure, the word such as "example" or "for example" is used to represent giving an example, an illustration, or a description. Any embodiment or design scheme described as an "example" or "for example" in this disclosure should not be explained as being more preferred or having more advantages than another embodiment or design scheme. Exactly, use of the word such as "example" or "for example" is intended to present a related concept in a specific manner.

In descriptions of this disclosure, the "indication" may include a direct indication and an indirect indication, or may include an explicit indication and an implicit indication. Information indicated by a piece of information (first indication information described below) is referred to as to-be-indicated information. In a specific implementation process, there are a plurality of manners of indicating the to-be-indicated information. For example, the to-be-indicated information may be directly indicated, where the to-be-indicated information itself, an index of the to-be-indicated information, or the like is indicated. For another example, the to-be-indicated information may be indirectly indicated by indicating other information, and there is an association relationship between the other information and the to-be-indicated information. For another example, only a part of the to-be-indicated information may be indicated, and the other part of the to-be-indicated information is already known or pre-agreed on. In addition, specific information may also be indicated by using a pre-agreed (for example, stipulated in a protocol) arrangement sequence of various pieces of information, to reduce indication overheads to some extent.

To facilitate understanding of the technical solutions of this disclosure, the following first briefly describes terms used in this disclosure.

1. Encryption/Decryption:

The encryption/decryption protects the confidentiality of data during transmission. Therefore, the encryption/decryption may also be referred to as confidentiality protection. The confidentiality means that the actual content cannot be directly seen. Encryption protection may be implemented by encrypting data by using a key and an encryption algorithm. For a specific encryption protection method, refer to related descriptions in section 8.2 in 3rd Generation Partnership Project (3GPP) TS 33.401 f50 or section 6.4.4 in 33.501 f50. Details are not described herein again.

For example, as shown in FIG. 1, an encryption process at a transmit end may be as follows. The transmit end may input parameters such as a count, a length, a bearer, and a direction into a New Radio (NR) encryption algorithm (NEA), to determine a keystream. Then, the transmit end determines a ciphertext based on the keystream and a plaintext.

For example, as shown in FIG. 1, a decryption process at a receive end may be as follows. The receive end may input parameters such as a count, a length, a bearer, and a direction into an NEA, to determine a keystream. Then, the receive end determines a plaintext based on the keystream and a ciphertext.

2. Integrity Protection/Check:

The integrity protection/check is used to determine whether content of a message is modified during transmission, and may also be used for identity authentication to determine a source of the message. The integrity check and protection require a MAC. For a specific method for the integrity check and protection, refer to related descriptions in section 8.1 in the 3GPP TS 33.401 f50 or section 6.4.3 in 33.501 f50. Details are not described herein again.

The MAC may be used to check whether content of a message is modified during transmission. In addition, the MAC may be used for identity authentication to determine a source of the message.

Figure 2:
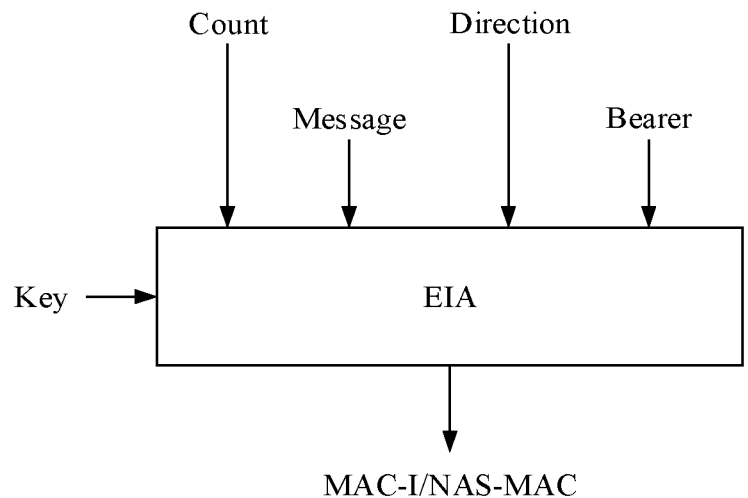
FIG. 2 is a schematic diagram of calculating a MAC by a transmitter.

As shown in FIG. 2, a transmit end inputs parameters such as a key, a count, a length, a bearer, a message, and a direction into an evolved packet system integrity algorithm (EIA), to obtain a MAC for integrity (MAC-I) or a NAS-MAC.

Figure 3:
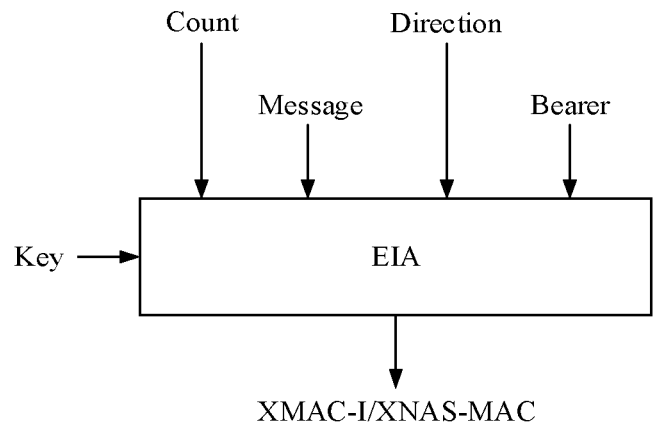
FIG. 3 is a schematic diagram of calculating a MAC by a receiver.

As shown in FIG. 3, a receive end inputs parameters such as an integrity protection key, a count, a length, a bearer, a message, and a direction into an EIA, to obtain an expected MAC-I (XMAC-I) or an expected NAS MAC (XNAS-MAC).

The receive end may compare a received MAC-I with the XMAC-I generated by the receive end, to check whether a message is complete. If the MAC-I is the same as the XMAC-I, the receive end determines that check on the received MAC-I succeeds, and the receive end can determine that the message sent by the transmit end is complete. If the MAC-I is different from the XMAC-I, the receive end can determine that check on the received MAC-I fails, and the receive end can determine that the message sent by the transmit end is incomplete.

3. Security Context:

The security context refers to information that can be used to implement security protection (for example, encryption/decryption, and/or integrity protection/check) of data.

The security context may include one or more of the following a root key, an encryption key, an integrity protection key, a specific parameter (such as a NAS count), a key set identifier (KSI), a security algorithm, a security indication (for example, an indication indicating whether encryption is enabled, an indication indicating whether integrity protection is enabled, an indication indicating a validity period of a key, or a key length), or the like.

The encryption key is a parameter input by a transmit end when the transmit end encrypts a plaintext based on an encryption algorithm to generate a ciphertext. If a symmetric encryption method is used, the encryption key and a decryption key are the same. A receive end may decrypt the ciphertext based on the same encryption algorithm and encryption key. In other words, the transmit end and the receive end may perform encryption and decryption based on a same key.

The integrity protection key is a parameter input by the transmit end when the transmit end performs integrity protection on a plaintext or a ciphertext based on an integrity protection algorithm. The receive end may perform, based on the same integrity protection algorithm and integrity protection key, integrity check on data on which integrity protection is performed.

The specific parameter (for example, the NAS count) is a parameter input by the transmit end when the transmit end performs anti-replay protection on a plaintext or a ciphertext based on an anti-replay protection algorithm. The receive end may perform, based on the same anti-replay protection algorithm, anti-replay check on data on which anti-replay protection is performed.

The security algorithm is used to perform security protection on data, such as an encryption algorithm, a decryption algorithm, and an integrity protection algorithm.

In the embodiments of this disclosure, the security context may include a NAS security context and an AS security context. It may be understood that the NAS security context is used to protect information transmitted between a terminal and a core network. The AS security context is used to protect information transmitted between the terminal and a base station.

4. NAS Security Activation:

The NAS security activation includes NAS integrity protection activation and NAS encryption protection activation.

NAS integrity protection activation Once NAS integrity protection is activated, a NAS integrity key and a NAS integrity protection algorithm in a current security context need to be used for integrity protection of subsequent uplink/downlink NAS messages. All messages without NAS integrity protection are not accepted and need to be discarded, except for some special NAS messages such as an attach request, a location area update request, a service request, a control plane service request, an authentication request, and an identity request. For example, after user equipment activates NAS integrity protection, each time the user equipment sends an uplink NAS message, the user equipment performs integrity protection on the uplink NAS message based on a NAS integrity key and a NAS integrity protection algorithm in a current security context, each time the user equipment receives a downlink NAS message, the user equipment performs integrity check on the downlink NAS message based on the NAS integrity key and the NAS integrity protection algorithm in the current security context. For example, after a mobility management network element activates NAS integrity protection, each time the mobility management network element receives an uplink NAS message, the mobility management network element performs integrity check on the uplink NAS message based on the NAS integrity key and the NAS integrity protection algorithm in the current security context, each time the mobility management network element sends a downlink NAS message, the mobility management network element performs integrity protection on the downlink NAS message based on the NAS integrity key and the NAS integrity protection algorithm in the current security context.

NAS encryption protection activation Once NAS encryption protection is activated, a NAS encryption key and a NAS encryption algorithm in a current security context need to be used for encryption protection of subsequent uplink/downlink NAS messages. All messages without NAS encryption protection are not accepted and need to be discarded. For example, after the user equipment activates NAS encryption protection, each time the user equipment sends an uplink NAS message, the user equipment performs encryption protection on the uplink NAS message based on a NAS encryption key and a NAS encryption algorithm in a current security context, each time the user equipment receives a downlink NAS message, the user equipment decrypts the downlink NAS message based on the NAS encryption key and the NAS encryption algorithm in the current security context. For example, after the mobility management network element activates NAS integrity protection, each time the mobility management network element receives an uplink NAS message, the user equipment decrypts the uplink NAS message based on a NAS encryption key and a NAS encryption algorithm in a current security context, each time the mobility management network element sends a downlink NAS message, the mobility management network element performs encryption protection on the downlink NAS message based on the NAS encryption key and the NAS encryption algorithm in the current security context.

5. 5G-S-TMSI:

A 5th generation-globally unique temporary identity (5G-GUTI) is assigned by an AMF to a terminal.

A structure of the 5G-GUTI is as follows: 5G-GUTI=<MCC>+<MNC>+<AMF region ID>+<AMF set ID>+<AMF pointer>+<5G-TMSI>.

The mobile country code (MCC) is a 3-digit decimal number, and is used to identify a country.

The mobile network code is a 2- or 3-digit decimal number, and is used to identify a carrier network in a country.

The AMF region ID occupies eight bits, and is used to identify a group of AMF sets (set).

The AMF set ID occupies 10 bits, and is used to identify a group of AMFs. The group of AMFs support a same network slice.

The AMF pointer occupies six bits, and is used to identify an AMF.

The 5G-TMSI occupies 32 bits, and is used to identify an AMF.

The 5G-S-TMSI is the least significant 48 bits of the 5G-GUTI. A structure of 5G-S-TMSI is as follows: 5G-S-TMSI=<AMF set ID>+<AMF pointer>+<5G-TMSI>.

In other words, the 5G-S-TMSI includes 48 bits, where the first bit to the tenth bit are used to indicate the AMF set ID, the eleventh bit to the sixteenth bit are used to indicate the AMF pointer, and the seventeenth bit to the forty-eighth bit are used to indicate the 5G-TMSI.

6. Truncated Parameter:

This parameter is used to truncate the 5G-S-TMSI.

For example, the truncated parameter may include a first truncated parameter and a second truncated parameter. The first truncated parameter is used to truncate the AMF set ID and the 5G-TMSI. The second truncated parameter is used to truncate the AMF pointer and the 5G-TMSI.

For ease of description, the first truncated parameter is denoted as n and the second truncated parameter is denoted as m below.

It should be noted that, truncated 5G-S-TMSI=<truncated AMF set ID>+<truncated AMF pointer>+<truncated 5G-TMSI>.

The truncated AMF set ID includes the last n bits in the original AMF set ID.

The truncated AMF pointer includes the last m bits in the original AMF pointer.

The truncated 5G-TMSI includes the last 40-n-m bits in the original 5G-TMSI.

For example, 5G-TMSI=<0000001010 (10 bits)><000110 (6 bits)><000100 . . . 10 (32 bits)>. Assuming that n=5 and m=3, truncated 5G-TMSI=<01010 (5 bits)><110 (3 bits)><000100 . . . 10 (32 bits)>.

It should be noted that after receiving the truncated 5G-TMSI, an access network device may restore the truncated 5G-TMSI to the complete 5G-TMSI by adding zeros.

The foregoing describes terms used in the embodiments of this disclosure, and details are not described below again.

CIoT terminals (such as electricity meters) that do not frequently transmit small packets have a requirement for battery durability. For example, this type of terminals require that the battery can be used for 10 years. To meet the requirement for battery durability, a CIoT 5GS optimization feature is designed in a 5G technology. A feature that a terminal periodically reports measurement reports is removed by using the CIoT 5GS optimization feature. Therefore, a source base station cannot obtain signal data to indicate the terminal to perform a handover procedure. In this case, a terminal that uses a control plane CIoT 5GS optimization function cannot be handed over, during movement, to another base station through a handover procedure like a conventional terminal. Therefore, a reestablishment procedure is introduced for the terminal that uses the control plane CIoT 5GS optimization function, to ensure session continuity during movement of the terminal.

In the reestablishment procedure, an RRC message reported by the terminal needs to carry a 5G-S-TMSI of the terminal, so that an access network device can determine a specific AMF based on the 5G-S-TMSI, and the AMF can find a security context of the terminal based on the 5G-S-TMSI. However, because the RRC message has a limited length, and a length of the 5G-S-TMSI exceeds a maximum length of the RRC message, the RRC message cannot carry the complete 5G-S-TMSI. Therefore, the terminal needs to truncate the 5G-S-TMSI by using a truncated parameter, so that the RRC message carries a truncated 5G-S-TMSI.

Figure 4:
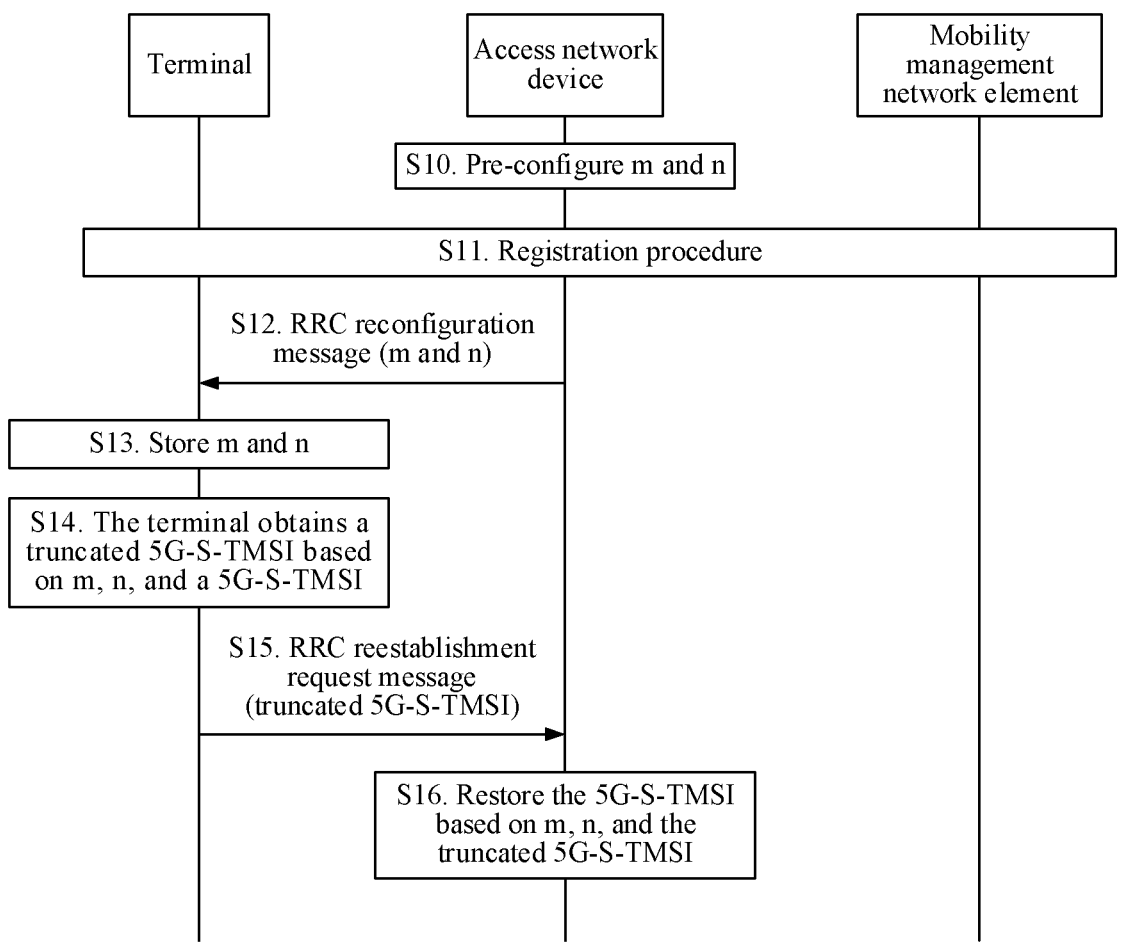
FIG. 4 is a schematic diagram of a truncated parameter configuration procedure in the current technology.

As shown in FIG. 4, in the current technology, a procedure in which an access network device configures a truncated parameter for a terminal includes the following steps.

S10. The access network device pre-configures m and n.

S11. The terminal and a network side perform a registration procedure.

S12. The access network device sends an RRC reconfiguration message to the terminal, where the RRC reconfiguration message includes m and n.

S13. The terminal stores m and n.

S14. The terminal obtains a truncated 5G-S-TMSI based on m, n, and a 5G-S-TMSI.

Optionally, a condition for performing step S14 by the terminal may be that a reestablishment procedure is triggered.

S15. The terminal sends an RRC reestablishment request message to the access network device, where the RRC reestablishment request message includes the truncated 5G-S-TMSI.

It should be noted that the RRC reestablishment request message may carry a maximum of 67 bits (bit) of information. At least 27 bits in the RRC reestablishment request message need to be reserved for parameters other than the 5G-S-TMSI. Therefore, the truncated 5G-S-TMSI carried in the RRC reestablishment request message cannot exceed 40 bits.

S16. The access network device restores the 5G-S-TMSI based on m, n, and the truncated 5G-S-TMSI.

In the procedure shown in FIG. 4, no AS security context is established between the access network device and a terminal that uses a control plane CIoT 5GS optimization function. Therefore, AS security protection is not performed on an RRC message sent by the access network device to the terminal that uses the control plane CIoT 5GS optimization function. Consequently, a truncated parameter carried in the RRC message has a security risk of being tampered with by an attacker.

To reduce a security risk of a truncated parameter in a transmission process, the embodiments of this disclosure provide a method for protecting a truncated parameter and an apparatus. For specific content of the method and apparatus, refer to the following descriptions.

The technical solutions provided in the embodiments of this disclosure may be applied to various communications systems, for example, a 5G communications system, a future evolved system, or a plurality of converged communications systems. The technical solutions provided in this disclosure may be applied to a plurality of disclosure scenarios, for example, machine-to-machine (M2M), macro-micro communication, enhanced mobile broadband (eMBB), ultra-reliable low-latency communication (uRLLC), and massive machine-type communications (mMTC). These scenarios may include but are not limited to a scenario of communication between communications devices, a scenario of communication between network devices, a scenario of communication between a network device and a communications device, and the like. The following provides descriptions by using an example in which the technical solutions are applied to a scenario in which a network device communicates with a terminal.

In addition, a network architecture and a service scenario that are described in the embodiments of this disclosure are intended to describe the technical solutions in the embodiments of this disclosure more clearly, and do not constitute a limitation on the technical solutions provided in the embodiments of this disclosure. A person of ordinary skill in the art may learn that as network architectures evolve and new service scenarios emerge, the technical solutions provided in the embodiments of this disclosure are also applicable to similar technical problems.

Figure 5:
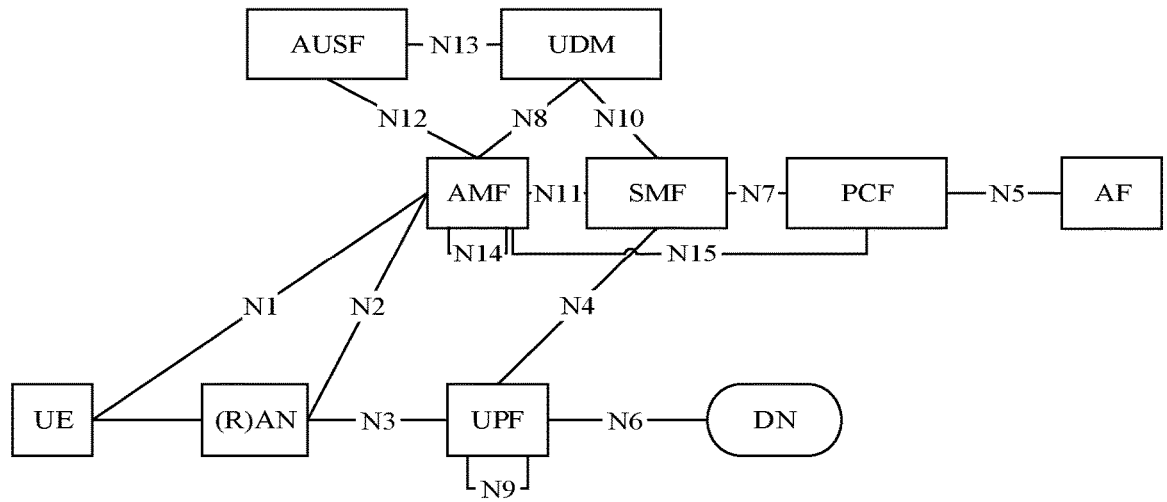
FIG. 5 is a schematic structural diagram of a 5G network according to an embodiment of this disclosure.

FIG. 5 shows an architecture of a 5G network to which the technical solutions provided in the embodiments of this disclosure are applicable. The 5G network may include a terminal, a radio access network (RAN) or an access network (AN) (where the RAN and the AN are collectively referred to as a (R)AN below), a core network (CN), and a data network (DN).

The terminal may have a wireless transceiver function. The terminal may have different names, for example, UE, an access terminal, a terminal unit, a terminal station, a mobile station, a mobile console, a remote station, a remote terminal, a mobile device, a wireless communications device, a terminal agent, or a terminal apparatus. The terminal may be deployed on land, including an indoor device, an outdoor device, a handheld device, or a vehicle-mounted device, or may be deployed on a water surface (such as on a ship), or may be deployed in the air (for example, on an aircraft, a balloon, or a satellite). The terminal includes a handheld device, a vehicle-mounted device, a wearable device, or a computing device that has a wireless communication function. For example, the terminal may be a mobile phone, a tablet computer, or a computer having a wireless transceiver function. The terminal device may alternatively be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In the embodiments of this disclosure, an apparatus for implementing a terminal function may be a terminal, or may be an apparatus that can support a terminal in implementing the function, for example, a chip system. In the embodiments of this disclosure, the chip system may include a chip, or may include a chip and another discrete component. In the embodiments of this disclosure, an example in which an apparatus for implementing a terminal function is a terminal is used to describe the technical solutions provided in the embodiments of this disclosure.

In the embodiments of this disclosure, the terminal may be a terminal that uses a control plane CIoT 5GS optimization function. The terminal that uses the CIoT 5GS optimization function transmits uplink and downlink subscriber data between the terminal and an SMF by using a payload of a NAS message, with no need to establish a packet data unit (PDU) session for a user-plane connection. The terminal that uses the CIoT 5GS optimization function and an AMF perform integrity protection and encryption on the subscriber data by using a NAS security context.

It should be noted that control plane CIoT 5GS optimization may also be denoted as CIoT 5GS control plane optimization. This is not limited in the embodiments of this disclosure.

The access network device may also be referred to as a base station. There may be base stations in various forms, for example, a macro base station, a micro base station (or a small cell), a relay station, and an access point. Further, the base station may be an access point (AP) in a wireless local area network (WLAN), a base transceiver station (BTS) in Global System for Mobile Communications (GSM) or code-division multiple access (CDMA), a NodeB (NB) in wideband CDMA (WCDMA), an Evolved NB (eNB), a relay station, an access point, a vehicle-mounted device, or a wearable device in Long-Term Evolution (LTE), a next generation NodeB (gNB) in a future 5G network, a base station in a future evolved public land mobile network (PLMN), or the like.

The base station generally includes a baseband unit (BBU), a remote radio unit (RRU), an antenna, and a feeder used to connect the RRU and the antenna. The BBU is configured to be responsible for signal modulation. The RRU is configured to be responsible for radio frequency processing. The antenna is configured to be responsible for conversion between a pilot wave on a cable and a space wave in the air. On one hand, a distributed base station greatly shortens a length of the feeder between the RRU and the antenna, thereby reducing a signal loss, and reducing costs of the feeder. On the other hand, the RRU and the antenna are relatively small and can be installed anywhere, making network planning more flexible. The RRU may be remotely placed. In addition, all BBUs may be centralized and placed in a central office (CO). In this centralized manner, a quantity of base station equipment rooms can be greatly reduced, energy consumption of auxiliary devices, especially air conditioners, can be reduced, and carbon emissions can be greatly reduced. In addition, after distributed BBUs are integrated into a BBU baseband pool, the BBUs can be managed and scheduled in a unified manner, and resources can be allocated more flexibly. In this mode, all physical base stations evolve into virtual base stations. All the virtual base stations share information such as data sent and received by users and channel quality in the BBU baseband pool, and cooperate with each other, to implement joint scheduling.

In some deployments, the base station may include a centralized unit (CU) and a distributed unit (DU). The base station may further include an active antenna unit (AAU). The CU implements some functions of the base station, and the DU implements some functions of the base station. For example, the CU is responsible for processing a non-real-time protocol and service, and implements functions of an RRC layer and a Packet Data Convergence Protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer eventually becomes information at the PHY layer, or is converted from information at the PHY layer. Therefore, in this architecture, higher layer signaling, for example, RRC signaling or PDCP signaling, may also be considered as being sent by the DU or sent by the DU and the AAU. It may be understood that, in the embodiments of this disclosure, the access network device may be a device including one or more of the CU node, the DU node, and the AAU node. In addition, the CU may be classified as a network device in a RAN, or the CU may be classified as a network device in a CN. This is not limited herein.

In a possible design, for the base station, a control plane (CP) and a user plane (UP) of the CU may be further separated and implemented by using different entities. In other words, the CU may be divided into a CU-CP and a CU-UP.

The core network includes a plurality of core network elements (or network function network elements), for example, an AMF network element, a session management function (SMF) network element, a policy control function (PCF) network element, a user plane function (UPF) network element, an application function network element, an authentication server function (AUSF) network element, and a unified data management (UDM) network element.

In addition, the core network may further include some network elements not shown in FIG. 5, for example, a security anchor function (SEAF) network element and an authentication credential repository and processing function (ARPF). Details are not described herein in the embodiments of this disclosure.

The AMF network element is mainly responsible for mobility management processing, for example, functions such as access control, mobility management, attachment and detachment, and SMF selection. When the AMF network element provides a service for a session in the terminal, the AMF network element provides a control plane storage resource for the session, to store a session identifier, an SMF identifier associated with the session identifier, and the like.

The terminal communicates with the AMF by using a next generation (N) 1 interface (N1), the RAN device communicates with the AMF by using an N2 interface (N2), the RAN device communicates with the UPF by using an N3 interface (N3), and the UPF communicates with the DN by using an N6 interface (N6).

Control plane network elements, such as the AMF, the SMF, the UDM, the AUSF, or the PCF, can also interact with each other by using service-oriented interfaces. For example, as shown in FIG. 5, a service-oriented interface externally provided by the AMF may be Namf, a service-oriented interface externally provided by the SMF may be Nsmf, a service-oriented interface externally provided by the UDM may be Nudm, a service-oriented interface externally provided by the PCF may be Npcf, and a service-oriented interface externally provided by the AUSF may be Nausf. Details are not described herein.

Figure 6:
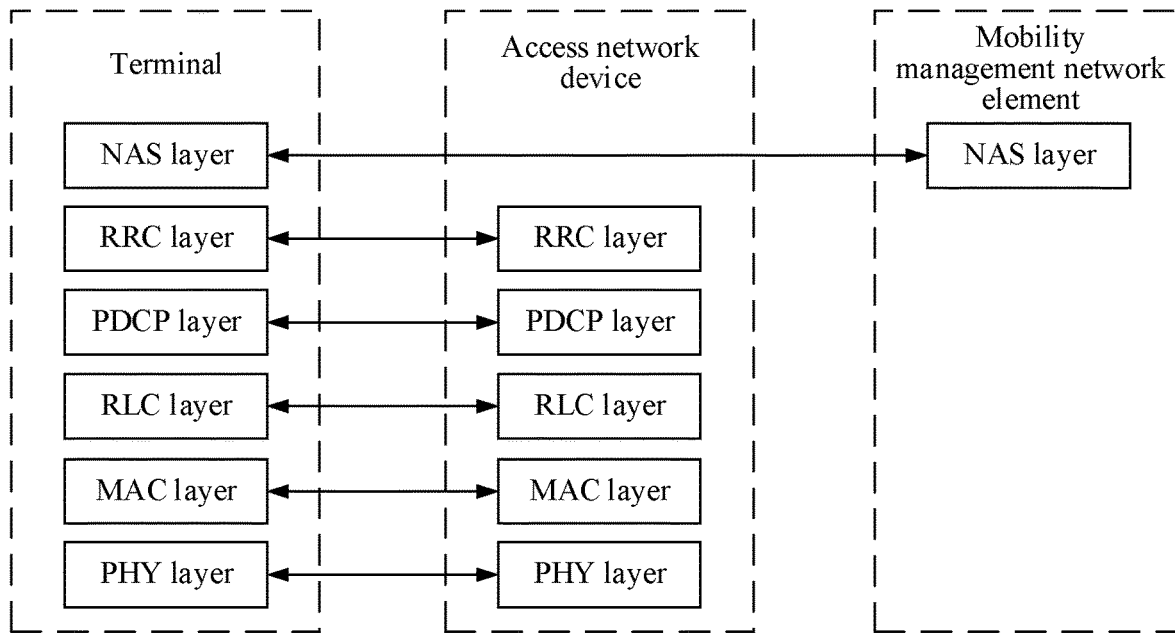
FIG. 6 is a schematic diagram of a protocol stack according to an embodiment of this disclosure.

FIG. 6 is a schematic diagram of a protocol stack according to an embodiment of this disclosure. As shown in FIG. 6, a protocol stack of a terminal includes at least a non-access stratum, an RRC layer, a PDCP layer, an RLC layer, a MAC layer, and a PHY layer. The RRC layer, the PDCP layer, the RLC layer, the MAC layer, and the PHY layer all belong to an access stratum.

The non-access stratum is a function layer between the terminal and a core network, and is used to support signaling and data transmission between the terminal and a network element (for example, a mobility management network element) of the core network.

The RRC layer is used to support functions such as radio resource management and RRC connection control.

For definitions and functions of other protocol layers such as the PDCP layer and the RLC layer, refer to descriptions in the current technology. Details are not described herein.

Figure 7:
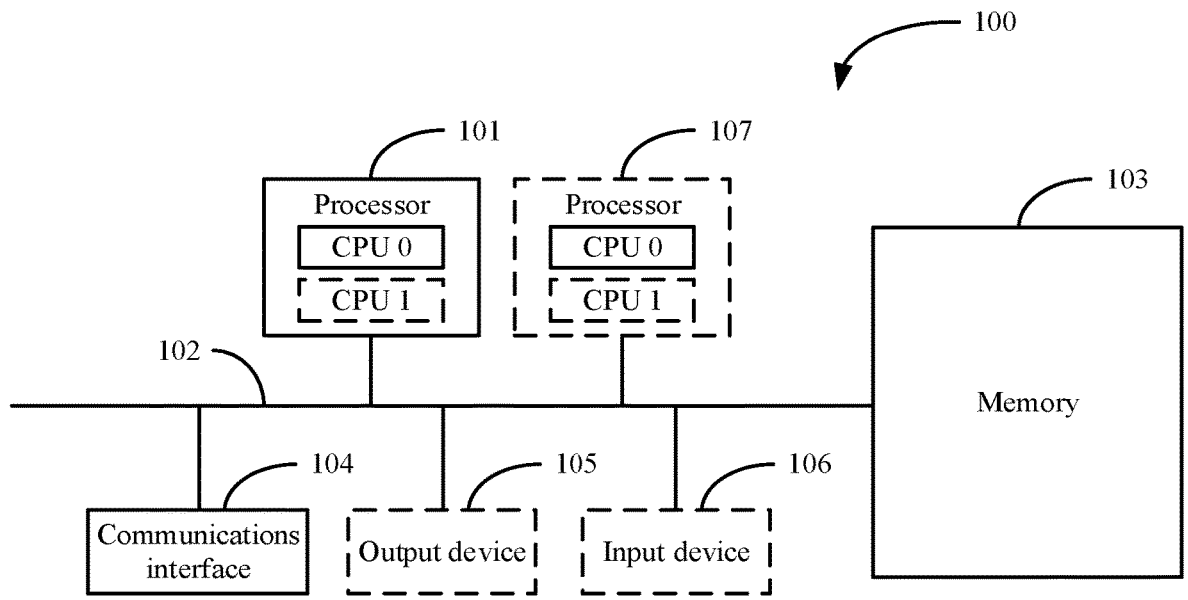
FIG. 7 is a schematic structural diagram of an apparatus according to an embodiment of this disclosure.

Optionally, all devices mentioned in the embodiments of this disclosure, such as the terminal, the mobility management network element, and the access network device, may be implemented by the apparatus shown in FIG. 7.

As shown in FIG. 7, the apparatus 100 includes at least one processor 101, a communications line 102, a memory 103, and at least one communications interface 104.

The processor 101 may be a general-purpose central processing unit (CPU), a microprocessor, an application-specific integrated circuit (ASIC), or one or more integrated circuits configured to control program execution of the solutions of this disclosure.

The communications line 102 is configured to transmit information between the foregoing components.

The communications interface 104 is configured to communicate with another device or a communications network, such as an Ethernet, a RAN, or a WLAN via any apparatus such as a transceiver.

The memory 103 may be a read-only memory (ROM) or another type of static storage device that can store static information and instructions, random-access memory (RAM) or another type of dynamic storage device that can store information and instructions, or may be an electrically erasable programmable ROM (EEPROM), a compact disc (CD) ROM (CD-ROM) or another CD storage, an optical disc storage (including a CD, a laser disc, an optical disc, a digital versatile disc (DVD), a BLU-RAY optical disc, and the like), a magnetic disk storage medium or another magnetic storage device, or any other medium that can be used to carry or store program code in a form of an instruction or a data structure and that can be accessed by a computer. However, the memory is not limited thereto. The memory may exist independently, and is connected to the processor through the communications line 102. Alternatively, the memory may be integrated with the processor.

The memory 103 is configured to store a computer-executable instruction for performing the solutions of this disclosure, and the processor 101 controls execution of the computer-executable instruction. The processor 101 is configured to execute the computer-executable instruction stored in the memory 103, to implement the technical solutions provided in the embodiments of this disclosure.

Optionally, the compute-executable instruction in the embodiments of this disclosure may also be referred to as application program code. This is not limited in the embodiments of this disclosure.

During specific implementation, in an embodiment, the processor 101 may include one or more CPUs, for example, a CPU 0 and a CPU 1 in FIG. 7.

During specific implementation, in an embodiment, the apparatus 100 may include a plurality of processors, for example, the processor 101 and a processor 107 in FIG. 7. Each of the processors may be a single-core (single-CPU) processor or a multi-core (multi-CPU) processor. The processor herein may be one or more devices, circuits, and/or processing cores configured to process data (for example, a computer program instruction).

During specific implementation, in an embodiment, the apparatus 100 may further include an output device 105 and an input device 106. The output device 105 communicates with the processor 101, and may display information in a plurality of manners. For example, the output device 105 may be a liquid-crystal display (LCD), a light-emitting diode (LED) display device, a cathode-ray tube (CRT) display device, or a projector. The input device 106 communicates with the processor 101, and may receive an input from a user in a plurality of manners. For example, the input device 106 may be a mouse, a keyboard, a touchscreen device, or a sensor device.

The following describes the technical solutions provided in this disclosure in detail with reference to the accompanying drawings of this specification.

To reduce a security risk of a truncated parameter in a transmission process, this disclosure provides the following three embodiments.

Embodiment 1 and embodiment 3 may be applied to a scenario in which a terminal accesses a network, and Embodiment 2 is applied to a scenario in which an AMF updates a truncated parameter for a terminal served by the AMF. It should be noted that, for technical features involved in the following three embodiments, refer to each other, and the three embodiments may be combined with each other. For example, when a terminal X that uses a control plane CIoT 5GS optimization function is registered with a network, execution of the solution in embodiment 1 may be triggered, to securely obtain a truncated parameter. Subsequently, an AMF on a network side also actively updates the truncated parameter of the terminal X according to the method described in embodiment 2.

Embodiment 1

Figure 8:
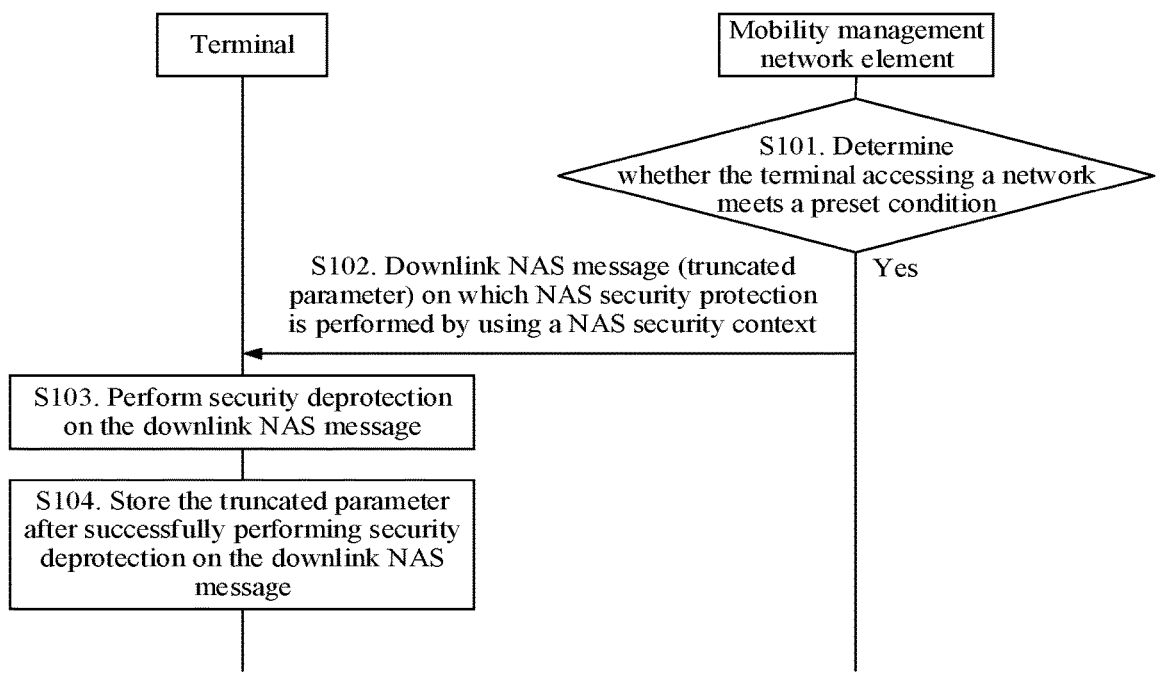
FIG. 8 is a flowchart of a method for protecting a truncated parameter according to an embodiment of this disclosure.

FIG. 8 shows a method for protecting a truncated parameter according to an embodiment of this disclosure. The method includes the following steps.

S101. A mobility management network element determines whether a terminal that accesses a network meets a preset condition.

In a 5G network, the mobility management network element may be an AMF. In a future evolved system, the mobility management network element may be a NAS security termination point similar to an AMF. A general description is provided herein, and details are not described below.

In this embodiment of this disclosure, the preset condition includes at least that the terminal uses a control plane CIoT 5GS optimization function.

Optionally, the preset condition includes the following cases.

Case 1: The preset condition is that the terminal uses the control plane CIoT 5GS optimization function.

Based on the case 1, step S101 may be further implemented as follows The mobility management network element determines whether the terminal uses the control plane CIoT 5GS optimization function. If the terminal uses the control plane CIoT 5GS optimization function, the mobility management network element determines that the terminal meets the preset condition, or if the terminal does not use the control plane CIoT 5GS optimization function, the mobility management network element determines that the terminal does not meet the preset condition.

In this embodiment of this disclosure, that the mobility management network element determines whether the terminal uses the control plane CIoT 5GS optimization function includes the following implementations.

Implementation 1: The mobility management network element determines, based on a preferred network behavior reported by the terminal, whether the terminal uses the control plane CIoT 5GS optimization function.

The preferred network behavior may be carried in a registration request message sent by the terminal. The preferred network behavior is used to indicate a network function supported by the terminal. In other words, the preferred network behavior is used to indicate a network function that the terminal prefers to use. For example, the preferred network behavior may indicate whether the terminal supports the control plane CIoT 5GS optimization function, supports a user plane CIoT 5GS optimization function, N3 data transmission, header compression, and the like.

To be specific, if the preferred network behavior reported by the terminal indicates that the terminal prefers to use the control plane CIoT 5GS optimization function, and the mobility management network element supports the control plane CIoT 5GS optimization function, the mobility management network element may determine that the terminal uses the control plane CIoT 5GS optimization function.

Alternatively, if the preferred network behavior reported by the terminal indicates that the terminal prefers to use the control plane CIoT 5GS optimization function, but the mobility management network element does not support the control plane CIoT 5GS optimization function, the mobility management network element may determine that the terminal does not use the control plane CIoT 5GS optimization function.

Alternatively, if the preferred network behavior reported by the terminal indicates that the terminal does not prefer to use the control plane CIoT 5GS optimization function, the mobility management network element determines that the terminal does not use the control plane CIoT 5GS optimization function.

Implementation 2: The mobility management network element determines, based on a context of the terminal, whether the terminal uses the control plane CIoT 5GS optimization function.

To be specific, when the context of the terminal indicates that the terminal uses the control plane CIoT 5GS optimization function, the mobility management network element determines that the terminal uses the control plane CIoT 5GS optimization function. Alternatively, when the context of the terminal indicates that the terminal does not use the control plane CIoT 5GS optimization function, the mobility management network element determines that the terminal does not use the control plane CIoT 5GS optimization function.

It should be noted that if the terminal uses the control plane CIoT 5GS optimization function, no AS security context is established between the terminal and an access network device. Therefore, a truncated parameter cannot be transmitted in a manner in the current technology, to prevent the truncated parameter from being tampered with by an attacker. Based on this, the mobility management network element needs to perform the following step S102.

Case 2: The preset condition is that the terminal uses the control plane CIoT 5GS optimization function, and the terminal is initially registered with a network.

Based on the case 2, step S101 may be further implemented as follows. The mobility management network element determines whether the terminal uses the control plane CIoT 5GS optimization function, and whether the terminal is initially registered with the network. If the terminal uses the control plane CIoT 5GS optimization function and the terminal is initially registered with the network, the mobility management network element determines that the terminal meets the preset condition, or if the terminal does not use the control plane CIoT 5GS optimization function or the terminal is not initially registered with the network, the mobility management network element determines that the terminal does not meet the preset condition.

In this embodiment of this disclosure, the mobility management network element determines, based on a registration type reported by the terminal, whether the terminal is initially registered with the network.

The registration type of the terminal may be carried in a registration request message sent by the terminal. The registration type of the terminal includes initial registration, mobility update registration, periodic registration update, and emergency registration.

To be specific, when the registration type of the terminal is initial registration, the mobility management network element may determine that the terminal is initially registered with the network. Alternatively, when the registration type of the terminal is mobility update registration, periodic registration update, or emergency registration, the mobility management network element may determine that the terminal is not initially registered with the network.

Optionally, in a registration procedure, the preset condition may be the preset condition in the case 2.

It should be noted that the truncated parameter does not change frequently. Therefore, a network side does not need to send the truncated parameter to the terminal in each registration procedure of the terminal. Therefore, for the terminal that uses the control plane CIoT 5GS optimization function, if the terminal is initially registered with the network, the mobility management network element performs the following step S102, to ensure that the terminal receives a correct truncated parameter, if the terminal is not initially registered with the network, it indicates that the terminal stores the truncated parameter, and the mobility management network element may choose not to perform the following step S102, to reduce signaling overheads.

Case 3: The preset condition is that the terminal uses the control plane CIoT 5GS optimization function and the terminal needs to update the truncated parameter.

Based on the case 3, step S101 may be further implemented as follows. The mobility management network element determines whether the terminal uses the control plane CIoT 5GS optimization function, and whether the terminal needs to update the truncated parameter. If the terminal uses the control plane CIoT 5GS optimization function and the terminal needs to update the truncated parameter, the mobility management network element determines that the terminal meets the preset condition, or if the terminal does not use the control plane CIoT 5GS optimization function, or the terminal does not need to update the truncated parameter, the mobility management network element determines that the terminal does not meet the preset condition.

In this embodiment of this disclosure, that the mobility management network element determines whether the terminal needs to update the truncated parameter includes one of the following implementations Implementation 1: The mobility management network element determines whether a truncated parameter configured in the mobility management network element is the same as the truncated parameter that is stored in a context of the terminal, to determine whether the terminal needs to update the truncated parameter.

It should be noted that the mobility management network element stores, in the context of the terminal, the truncated parameter currently used by the terminal. That is, the truncated parameter stored in the context of the terminal is the truncated parameter currently used by the terminal.

When the truncated parameter configured in the mobility management network element is different from the truncated parameter stored in the context of the terminal, the mobility management network element may determine that the terminal needs to update the truncated parameter. Alternatively, when the truncated parameter configured in the mobility management network element is the same as the truncated parameter stored in the context of the terminal, the mobility management network element may determine that the terminal does not need to update the truncated parameter.

Implementation 2: The mobility management network element determines whether a current time is within a preset time period, to determine whether the terminal needs to update the truncated parameter.

A start moment of the preset time period is a moment at which the mobility management network element determines that the truncated parameter is updated, and duration of the preset time period is preset duration. For example, the preset duration may be one minute, or may be 10 minutes.

Optionally, the preset duration is greater than a time interval of periodic registration update.

For example, the preset duration may be greater than twice the time interval of the periodic registration update.

It should be noted that a network side may configure the time interval of the periodic registration update for the terminal, for example, 10 minutes. After a waiting time of the terminal exceeds the time interval, the terminal actively initiates a registration request, so that the network side knows that the terminal is still online. Therefore, if the network side sets the preset duration to be greater than twice the time interval of the periodic registration update, within the preset duration, the mobility management network element can ensure that all online terminals can update the truncated parameter.

That is, when the current time is within the preset time period, the mobility management network element determines that the terminal needs to update the truncated parameter. When the current time is not within the preset time period, the mobility management network element determines that the terminal does not need to update the truncated parameter.

Optionally, in a scenario in which the truncated parameter is updated, the preset condition may be the preset condition in the case 3.

It should be noted that, for a manner of updating the truncated parameter by the mobility management network element, refer to the following description of step S401. Details are not described herein.

It should be noted that, regardless of whether the terminal stores the truncated parameter, when the network side updates the truncated parameter, the network side needs to send an updated truncated parameter to the terminal, to prevent the terminal from obtaining an incorrect truncated 5G-S-TMSI by using the truncated parameter that is before the update. Therefore, for the terminal that uses the control plane CIoT 5GS optimization function, when the mobility management network element determines that the terminal needs to update the truncated parameter, the mobility management network element performs the following step S102, to ensure that the terminal can obtain a latest truncated parameter, thereby ensuring that the terminal can normally access the network, when the mobility management network element determines that the terminal does not need to update the truncated parameter, the mobility management network element may not perform the following step S102, to reduce signaling overheads.

It should be noted that the foregoing case 1 to case 3 are merely examples of the preset condition, and this embodiment of this disclosure is not limited thereto.

S102. The mobility management network element sends, to the terminal when the terminal meets the preset condition, a downlink NAS message on which NAS security protection is performed by using a NAS security context, where the downlink NAS message includes the truncated parameter.

Optionally, the mobility management network element may pre-store the truncated parameter, or the mobility management network element obtains the truncated parameter from the access network device.

The NAS security protection includes at least integrity protection. Optionally, the NAS security protection further includes encryption protection.

It may be understood that because NAS security protection is performed on the downlink NAS message, NAS security protection is also performed on the truncated parameter in the downlink NAS message, so that security of the truncated parameter can be ensured.

It should be noted that the downlink NAS message may be new signaling, or signaling in an existing procedure may be reused.

For example, in a registration procedure, the downlink NAS message may be a registration accept message.

For another example, in a service request procedure, the downlink NAS message may be a service accept message.

S103. The terminal performs security deprotection on the downlink NAS.

When the NAS security protection performed on the downlink NAS message is integrity protection, the security deprotection is integrity check. Alternatively, when integrity protection and encryption protection are performed on the downlink NAS message, the security deprotection is integrity check and decryption.

S104. The terminal stores the truncated parameter after successfully performing security deprotection on the downlink NAS message.

In a possible implementation, after a NAS layer of the terminal successfully performs security deprotection on the downlink NAS message, the NAS layer of the terminal stores the truncated parameter.

In another possible implementation, after a NAS layer of the terminal successfully performs security deprotection on the downlink NAS message, the NAS layer of the terminal sends the truncated parameter to an RRC layer of the terminal, and the RRC layer of the terminal stores the truncated parameter.

Based on the technical solution shown in FIG. 8, because the preset condition includes at least that the terminal uses the control plane CIoT 5GS optimization function, that the terminal meets the preset condition indicates that the terminal uses the control plane CIoT 5GS optimization function. When determining that the terminal uses the control plane CIoT 5GS optimization function, the mobility management network element sends, to the terminal, the downlink NAS message on which NAS security protection is performed by using the NAS security context, to ensure that NAS security protection is performed on the truncated parameter in a transmission process. In this way, it is ensured that the truncated parameter is not tampered with or forged, thereby avoiding a denial of service attack launched by an attacker against the terminal, and further ensuring that the terminal can normally access the network.

The following describes the technical solution shown in FIG. 8 with reference to specific application scenarios.

Scenario 1: The mobility management network element pre-stores the truncated parameter.

Figure 9:
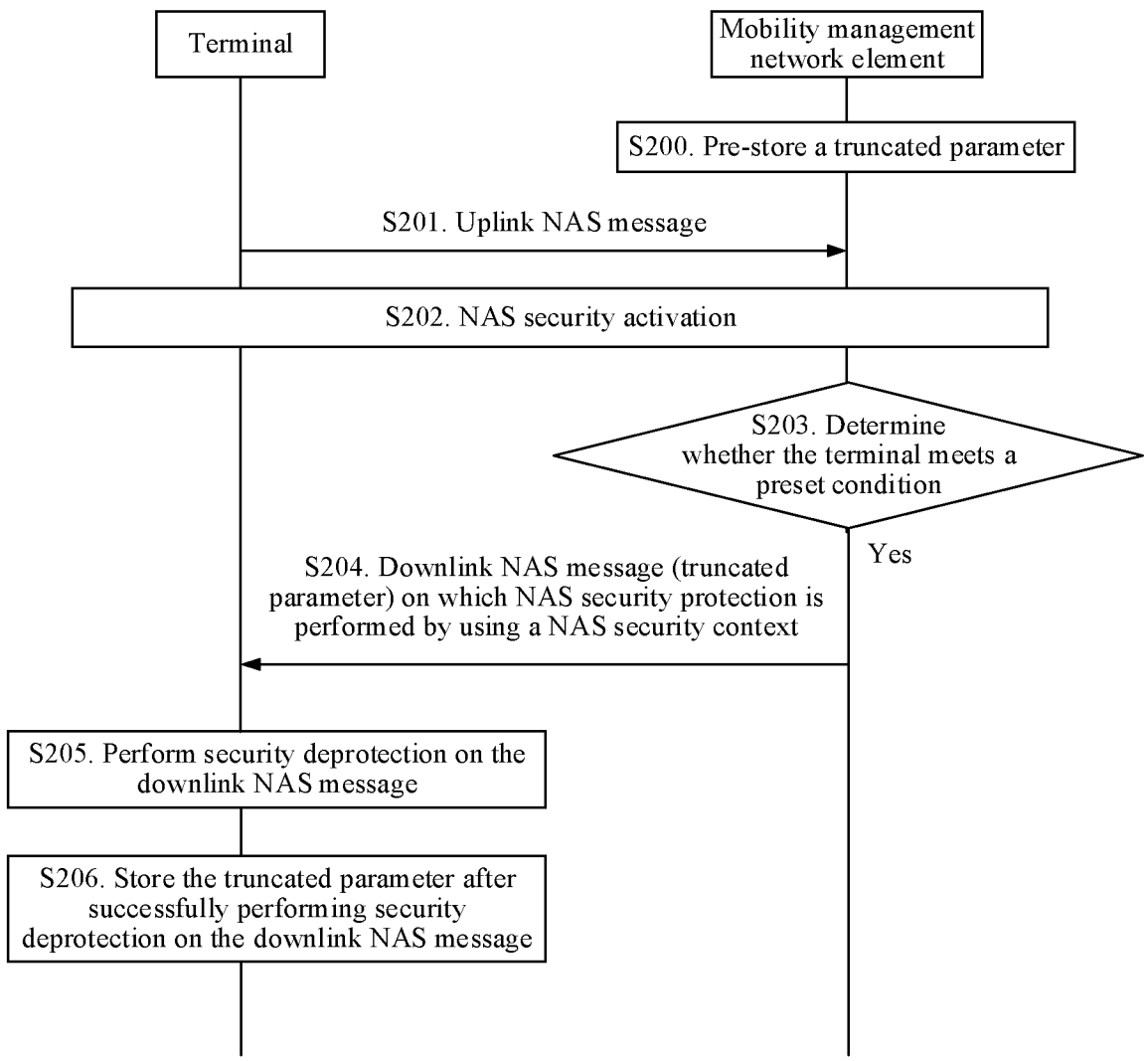
FIG. 9 is another flowchart of a method for protecting a truncated parameter according to an embodiment of this disclosure.

Based on the scenario 1, FIG. 9 shows a method for protecting a truncated parameter according to an embodiment of this disclosure. The method includes the following steps.

S200. The mobility management network element pre-stores the truncated parameter.

Optionally, an operator may configure the truncated parameter for the mobility management network element by using a network management system, so that the mobility management network element may pre-store the truncated parameter.

In a possible design, the truncated parameter may be at a PLMN granularity, or may be at a region granularity. That is, the truncated parameter configured in the network management system may be applicable to an entire PLMN, or only to a region.

A specific implementation of how the mobility management network element pre-configures the truncated parameter is not limited in this embodiment of this disclosure.

S201. The terminal sends an uplink NAS message to the mobility management network element, so that the mobility management network element receives the uplink NAS message sent by the terminal.

For example, the uplink NAS message may be a registration request message, a service request message, or the like. This is not limited in this embodiment of this disclosure.

It should be noted that the registration request message may include a registration type (5GS registration type) and a preferred network behavior.

S202. The terminal and the mobility management network element activate NAS security.

For example, the uplink NAS message is a registration request message. After the mobility management network element receives the registration request message, the mobility management network element performs an authentication and key agreement (AKA) procedure for the terminal. Then, after the authentication succeeds, the mobility management network element and the terminal activate the NAS security context between the terminal and the mobility management network element by using a NAS security mode command (SMC) procedure.

For example, the uplink NAS message is a service request message. After the mobility management network element receives the service request message, the mobility management network element performs integrity check on the service request message. After the integrity check on the service request message succeeds, the mobility management network element activates the NAS security context between the terminal and the mobility management network element.

S203 to S206 are similar to steps S101 to S104. For specific descriptions thereof, refer to the embodiment shown in FIG. 8. Details are not described herein again.

Optionally, when the uplink NAS message is a registration request message, the downlink NAS message is a registration accept message.

Optionally, when the uplink NAS message is a service request message, the downlink NAS message is a service accept message.

Based on the embodiment shown in FIG. 9, in some procedures, for example, in a registration procedure or a service request procedure, the mobility management network element may actively determine whether the terminal meets the preset condition. The mobility management network element sends, to the terminal when the terminal meets the preset condition, the truncated parameter on which NAS security protection is performed, so that the terminal can use the truncated parameter in a subsequent procedure.

Scenario 2: The access network device pre-stores the truncated parameter.

Figure 10:
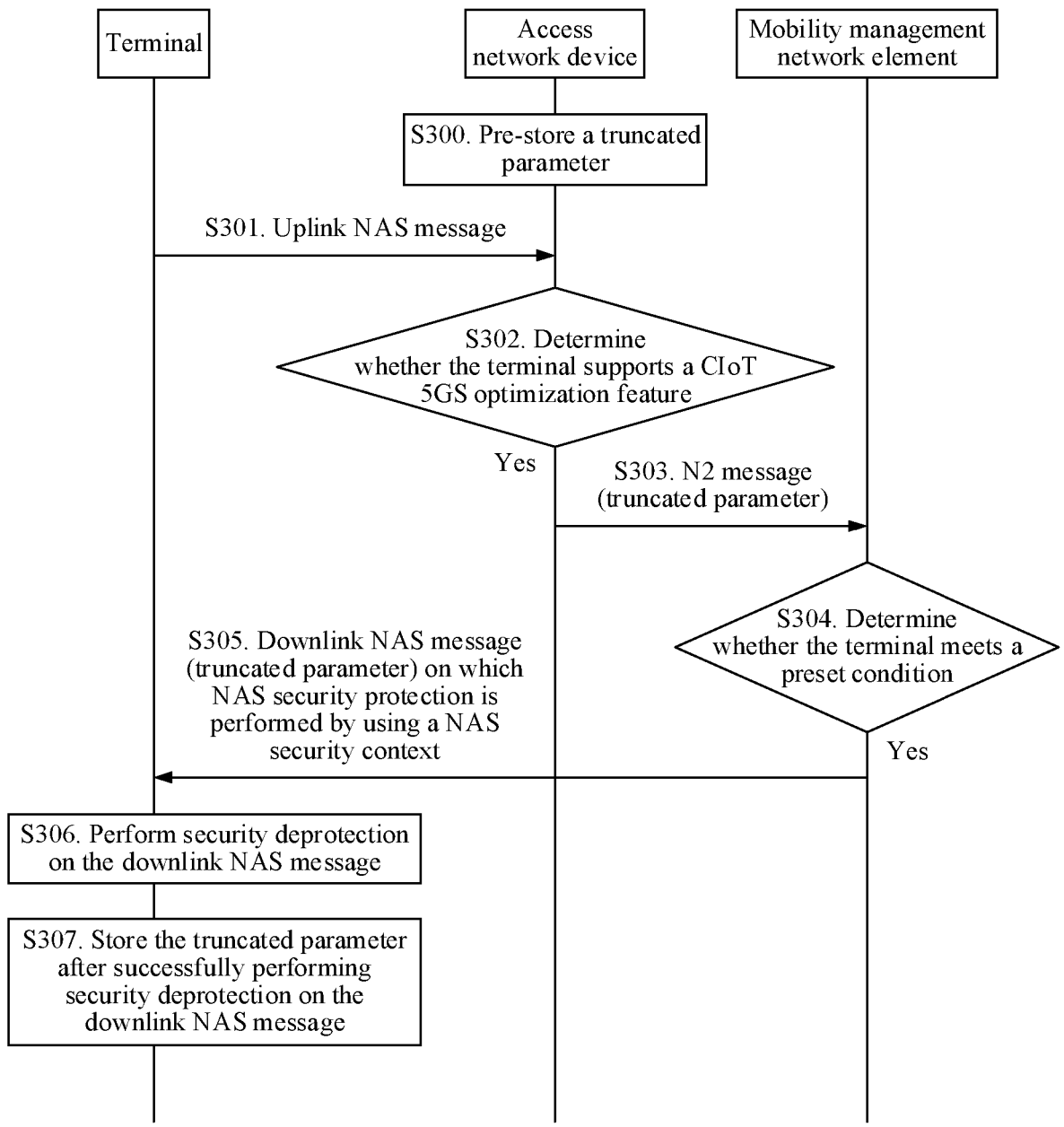
FIG. 10 is another flowchart of a method for protecting a truncated parameter according to an embodiment of this disclosure.

Based on the scenario 2, FIG. 10 shows a method for protecting a truncated parameter according to an embodiment of this disclosure. The method includes the following steps.

S300. The access network device pre-stores the truncated parameter.

It should be noted that the access network device usually pre-configures the truncated parameter, so that the access network device restores a complete 5G-S-TMSI based on the truncated parameter and a truncated 5G-S-TMSI.

Optionally, an operator may configure the truncated parameter for the access network device by using a network management system, so that the access network device can pre-store the truncated parameter.

In a possible design, the truncated parameter may be at a PLMN granularity, or may be at a region granularity. That is, the truncated parameter configured in the network management system may be applicable to an entire PLMN, or only to a region.

A specific implementation of how the access network device pre-configures the truncated parameter is not limited in this embodiment of this disclosure.

S301. The terminal sends an uplink RRC message to the access network device.

For example, the uplink RRC message may be an RRC establishment request message or an RRC establishment complete message. This is not limited in this embodiment of this disclosure.

Optionally, in addition to the uplink RRC message, the terminal may further send an uplink NAS message to the access network device, so that the access network device forwards the uplink NAS message to the mobility management network element. For example, the uplink NAS message may be a registration request message or a service request message. This is not limited in this embodiment of this disclosure.

In a possible design, the uplink NAS message may be used as a payload of the uplink RRC message. For example, the uplink RRC message includes a NAS container, and the NAS container includes the uplink NAS message. In this way, the terminal sends the uplink RRC message to the access network device, to transmit the uplink RRC message and the uplink NAS message together to the network side.

In another possible design, the terminal separately sends the uplink NAS message and the uplink RRC message to the access network device.

S302. The access network device determines whether the terminal supports a CIoT 5GS optimization feature.

The CIoT 5GS Optimization feature includes the user plane CIoT 5GS optimization function and/or the control plane CIoT 5GS optimization function.

That is, the terminal supports the CIoT 5GS optimization feature, indicating that the terminal may support the user plane CIoT 5GS optimization function and/or the control plane CIoT 5GS optimization function.

Optionally, at least one of the following implementations is used in step S302.

Implementation 1: When the uplink RRC message includes a capability indication, the access network device determines, based on the capability indication, whether the terminal supports the CIoT 5GS optimization feature. To be specific, if the capability indication is used to indicate that the terminal supports the CIoT 5GS optimization feature, the access network device determines that the terminal supports the CIoT 5GS optimization feature.

Optionally, if the capability indication does not indicate that the terminal supports the CIoT 5GS optimization feature, the access network device determines that the terminal does not support the CIoT 5GS optimization feature.

Implementation 2: The access network device determines, based on a frequency for access of the terminal, whether the terminal supports the CIoT 5GS optimization feature. To be specific, if a frequency used by a CIoT device is the frequency for access of the terminal, the access network device determines that the terminal supports the CIoT 5GS optimization feature.

Optionally, if a frequency used by the terminal is not a frequency for access of a CIoT device, the access network device determines that the terminal does not support the CIoT 5GS optimization feature.

Implementation 3: The access network device determines, based on a type of a message sent by the terminal, whether the terminal supports the CIoT 5GS optimization feature. To be specific, if the type of the message sent by the terminal is the same as a type of a message dedicated to a CIoT device, the access network device determines that the terminal supports the CIoT 5GS optimization feature.

Optionally, if the type of the message sent by the terminal is different from as a type of a message dedicated to a CIoT device, the access network device determines that the terminal does not support the CIoT 5GS optimization feature.

It may be understood that Implementation 1 to Implementation 3 are merely examples of specific implementations of step S302. In an actual application, implementation 1, implementation 2, and/or implementation 3 may be used in combination.

It should be noted that if the access network device determines that the terminal supports the CIoT 5GS optimization feature, the access network device performs the following step S303.

S303. The access network device sends an N2 message to the mobility management network element, so that the mobility management network element receives the N2 message sent by the access network device.

The N2 message includes the truncated parameter.

Optionally, the N2 message may be an initial UE message.

Optionally, when the terminal further sends an uplink NAS message to the access network device, the N2 message carries the uplink NAS message.

S304 to S307 are similar to steps S101 to S104. For specific descriptions thereof, refer to the embodiment shown in FIG. 8. Details are not described herein again.

Based on the embodiment shown in FIG. 10, when the access network device stores the truncated parameter, the access network device determines whether the accessed terminal supports the CIoT 5GS optimization feature. Then, the access network device sends the truncated parameter to the mobility management network element when the terminal supports the CIoT 5GS optimization feature, so that in a subsequent procedure, the mobility management network element may send, to the terminal that uses the control plane CIoT 5GS optimization function, the truncated parameter on which NAS security protection is performed. In the foregoing process, the mobility management network element may obtain the truncated parameter from the access network device. Therefore, the mobility management network element does not need to pre-configure the truncated parameter, thereby reducing configuration complexity of the truncated parameter.

Embodiment 2

Figure 11:
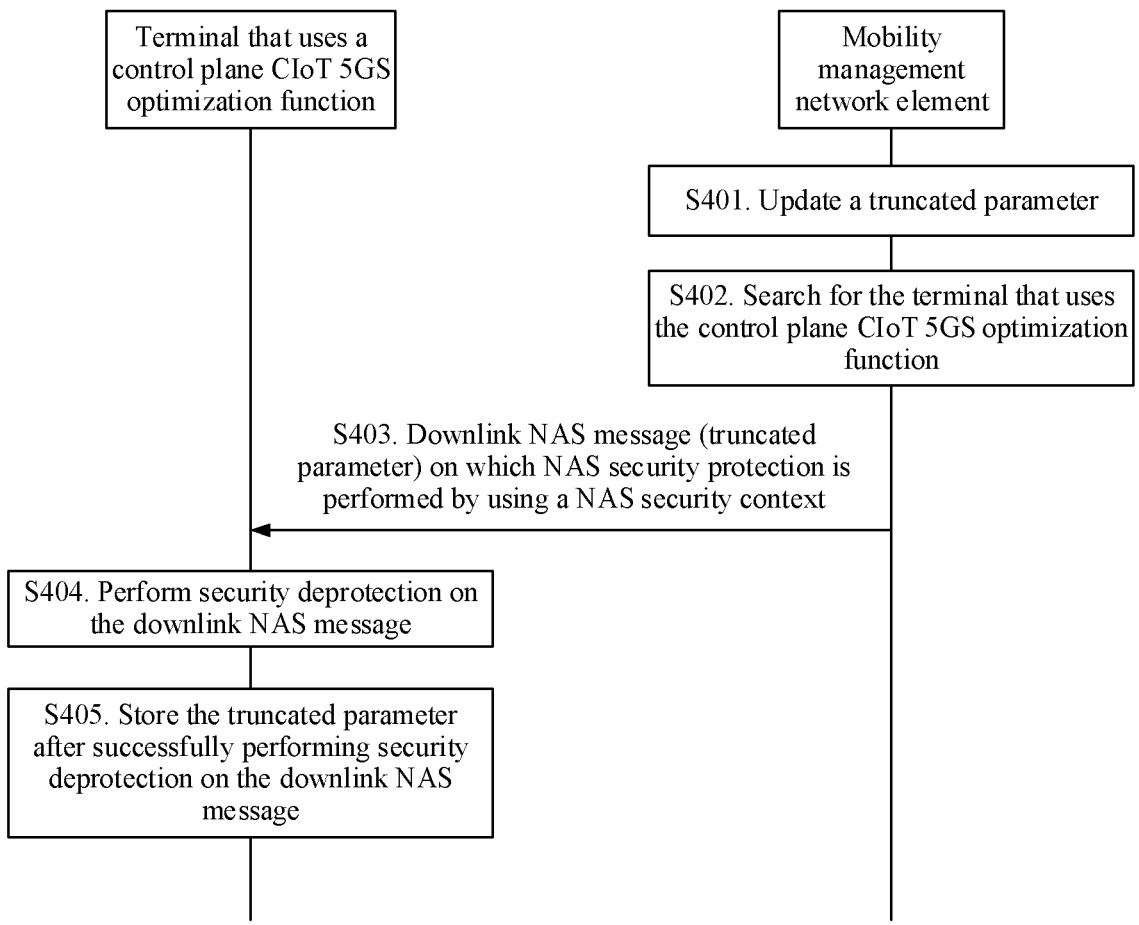
FIG. 11 is another flowchart of a method for protecting a truncated parameter according to an embodiment of this disclosure.

FIG. 11 shows a method for protecting a truncated parameter according to an embodiment of this disclosure. The method includes the following steps.

S401. A mobility management network element updates a truncated parameter.

Optionally, step S401 may include one of the following implementations

Implementation 1: The mobility management network element updates the truncated parameter based on a quantity of AMF set IDs and/or a quantity of AMF pointers.

For example, if an AMF set ID and/or an AMF pointer that are/is truncated based on a current truncated parameter cannot represent all allocated mobility management network elements, the mobility management network element needs to adjust the truncated parameter.

For example, for the current truncated parameter, n is set to 5, and m is set to 3. In this case, a truncated AMF set ID has only five bits, and a total quantity of AMF sets that can be indicated by the truncated AMF set ID is 32, a truncated AMF pointer has only three bits, and a total quantity of pointers that can be indicated by the truncated AMF pointer is 8. If a current quantity of AMF sets is 14 and a current quantity of pointers is 9, the mobility management network element needs to update the truncated parameter. Optionally, for an updated truncated parameter, n may be adjusted to 4, and m may be adjusted to 4. In this way, a total quantity of AMF sets that can be indicated by a truncated AMF set ID is 16, and a total quantity of pointers that can be indicated by a truncated AMF pointer is 16.

Implementation 2: The mobility management network element updates the truncated parameter according to an instruction of a network management system.

Optionally, the network management system may be an operation, administration and maintenance (OAM) system.

Implementation 3: The mobility management network element receives the updated truncated parameter sent by an access network device.

It should be noted that the access network device may update the truncated parameter according to an instruction of a network management system.

S402. The mobility management network element searches for a terminal that uses a control plane CIoT 5GS optimization function.

In a possible implementation, the mobility management network element stores a context of the terminal, and the context of the terminal includes indication information indicating whether the corresponding terminal uses the control plane CIoT 5GS optimization function. The mobility management network element determines, based on contexts of a plurality of terminals that are stored in the mobility management network element, the terminal that uses the control plane CIoT 5GS optimization function.

It may be understood that there may be one or more terminals using the control plane CIoT 5GS optimization function.

S403. The mobility management network element sends, to the terminal that uses the control plane CIoT 5GS optimization function, a downlink NAS message on which NAS security protection is performed by using a NAS security context.

The downlink NAS message includes the updated truncated parameter.

For any terminal that uses the control plane CIoT 5GS optimization function, that the mobility management network element sends the downlink NAS message to the terminal includes one of the following implementations.

Implementation 1: If the terminal that uses the control plane CIoT 5GS optimization function is in a connected state, the mobility management network element may directly send, to the terminal that uses the control plane CIoT 5GS optimization function, the downlink NAS message on which NAS security protection is performed by using the NAS security context.

Optionally, based on Implementation 1, the downlink NAS message may be a UE configuration update command message.

Implementation 2: If the terminal that uses the control plane CIoT 5GS optimization function is in a non-connected state, the mobility management network element waits for the terminal to enter a connected state. After the terminal enters the connected state and NAS security is activated, the mobility management network element sends, to the terminal, the downlink NAS message on which NAS security protection is performed by using the NAS security context.

In this embodiment of this disclosure, the non-connected state may be an idle state or an RRC inactive state.

It should be noted that the terminal in the non-connected state may actively initiate a service request message to enter the connected state.

Optionally, based on Implementation 2, the downlink NAS message may be a service accept message or a UE configuration update command message.

Implementation 3: If the terminal that uses the control plane CIoT 5GS optimization function is in a non-connected state, the mobility management network element pages the terminal to trigger the terminal to enter a connected state. After the terminal enters the connected state and NAS security is activated, the mobility management network element sends, to the terminal, the downlink NAS message on which NAS security protection is performed by using the NAS security context.

Optionally, based on Implementation 3, the downlink NAS message may be a service accept message or a UE configuration update command message.

It should be noted that when the terminal is in the non-connected state, the terminal does not need to truncate a 5G-S-TMSI. Therefore, the terminal in the non-connected state does not need to immediately update the truncated parameter. In this case, the mobility management network element updates the truncated parameter for the terminal after the terminal is restored to the connected state, to prevent the mobility management network element from sending a large amount of NAS signaling to the terminal at the same time, thereby avoiding signaling congestion.

In addition, based on Implementation 3, the mobility management network element does not actively wake up the terminal that is in the non-connected state, which helps reduce power consumption of the terminal.

S404 and S405 are similar to steps S103 and S104. For specific descriptions thereof, refer to the embodiment shown in FIG. 8. Details are not described herein again.

Based on the technical solution shown in FIG. 11, after updating the truncated parameter, the mobility management network element actively sends the updated truncated parameter on which NAS security protection is performed to the terminal that uses the control plane CIoT 5GS optimization function, so that the terminal can obtain the updated truncated parameter. This avoids a case in which the terminal cannot normally access a network because the terminal uses an incorrect truncated parameter.

Embodiment 3

Figure 12:
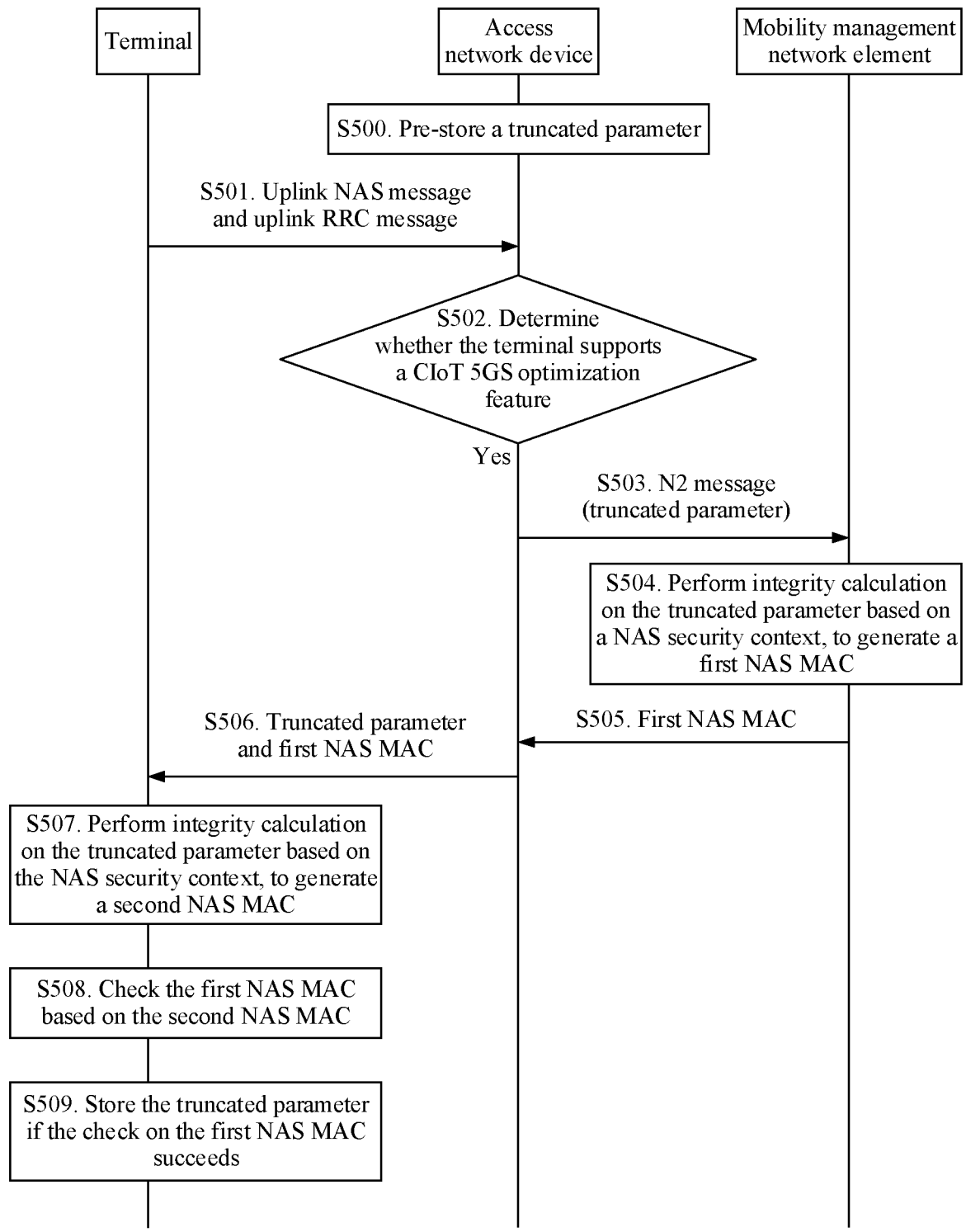
FIG. 12 is another flowchart of a method for protecting a truncated parameter according to an embodiment of this disclosure.

FIG. 12 shows a method for protecting a truncated parameter according to an embodiment of this disclosure. The method includes the following steps.

S500 to S503 are similar to steps S300 to S303. For specific descriptions thereof, refer to the embodiment shown in FIG. 10. Details are not described herein again.

Optionally, in addition to the truncated parameter, the access network device may further send a freshness parameter and/or protection indication information to the mobility management network element.

The freshness parameter is used for integrity calculation of the truncated parameter, and the freshness parameter is used to ensure that NAS MACs generated at two times are different. For example, the freshness parameter may be a downlink PDCP count.

The protection indication information is used to indicate the mobility management network element to perform security protection on the truncated parameter.

S504. The mobility management network element performs integrity calculation on the truncated parameter based on a NAS security context, to generate a first NAS MAC.

In a possible implementation, when the mobility management network element receives the truncated parameter, the mobility management network element performs integrity calculation on the truncated parameter, to generate the first NAS MAC.

In another possible implementation, when the mobility management network element receives the truncated parameter and the protection indication information, the mobility management network element performs integrity calculation on the truncated parameter, to generate the first NAS MAC. When the mobility management network element receives the truncated parameter but does not receive the protection instruction information, the mobility management network element does not perform integrity calculation on the truncated parameter.

Optionally, the mobility management network element generates the first NAS MAC based on an integrity protection key, the truncated parameter, and an integrity protection algorithm.

Optionally, when the access network device sends the freshness parameter to the mobility management network element, the mobility management network element generates the first NAS MAC based on the integrity protection key, the truncated parameter, the integrity protection algorithm, and the freshness parameter.

S505. The mobility management network element sends the first NAS MAC to the access network device, so that the access network device receives the first NAS MAC sent by the mobility management network element.

S506. The access network device sends the truncated parameter and the first NAS MAC to the terminal, so that the terminal receives the truncated parameter and the first NAS MAC that are sent by the access network device.

The truncated parameter and the first NAS MAC may be carried in a downlink RRC message.

Optionally, the downlink RRC message further carries a freshness parameter indication, and the freshness parameter indication may be some bits of the downlink PDCP count.

For example, the downlink RRC message may be an RRC reconfiguration message. This is not limited in this embodiment of this disclosure.

S507. The terminal performs integrity calculation on the truncated parameter based on the NAS security context, to generate a second NAS MAC.

Optionally, the terminal generates the second NAS MAC based on the integrity protection key, the truncated parameter, and the integrity protection algorithm.

Optionally, when the terminal further receives the freshness parameter indication sent by the access network device, the terminal generates the second NAS MAC based on the integrity protection key, the truncated parameter, a freshness parameter, and the integrity protection algorithm.

It should be noted that after the terminal receives the freshness parameter indication, the terminal may obtain the freshness parameter based on the freshness parameter indication. For example, the terminal restores the complete downlink PDCP COUNT based on the some bits of the downlink PDCP COUNT.

S508. The terminal checks the first NAS MAC based on the second NAS MAC.

In a possible implementation, the terminal determines whether the second NAS MAC is the same as the first NAS MAC. If the first NAS MAC is the same as the second NAS MAC, the terminal determines that the check on the first NAS MAC succeeds. If the first NAS MAC is different from the second NAS MAC, the terminal determines that the check on the first NAS MAC fails.

S509. The terminal stores the truncated parameter after the check on the first NAS MAC succeeds.

In a possible implementation, after the check on the first NAS MAC succeeds, an RRC layer of the terminal stores the truncated parameter.

In another possible implementation, after the check on the first NAS MAC succeeds, an RRC layer of the terminal sends the truncated parameter to a NAS layer of the terminal. Then, the NAS layer of the terminal stores the truncated parameter.

Based on the technical solution shown in FIG. 12, when the access network device needs to send the truncated parameter to the terminal, the access network device first sends the truncated parameter to the mobility management network element, to obtain the first NAS MAC corresponding to the truncated parameter. Then, the access network device sends the truncated parameter and the first NAS MAC to the terminal. In this way, the terminal can check, by using the first NAS MAC, whether the truncated parameter is tampered with by an attacker, thereby ensuring integrity of the truncated parameter. When the terminal obtains the correct truncated parameter, the terminal can normally access a network.

When a radio link failure (RLF) occurs, a terminal that uses the control plane CIoT 5GS optimization function may trigger an RRC connection reestablishment procedure. In the RRC connection reestablishment procedure, the terminal needs to send an RRC reestablishment request message to a target access network device, and the RRC reestablishment request message carries a truncated 5G-S-TMSI.

Therefore, the UE needs to obtain the truncated 5G-S-TMSI in the RRC connection reestablishment procedure.

Optionally, that the terminal obtains the truncated 5G-S-TMSI includes one of the following implementations.

Implementation 1: When the RRC layer of the terminal is responsible for storing a truncated parameter, when the terminal needs to use the truncated 5G-S-TMSI, the RRC layer of the terminal truncates a 5G-S-TMSI based on the truncated parameter, to obtain the truncated 5G-S-TMSI.

Implementation 2: When an RRC layer of the terminal is responsible for storing a truncated parameter, when the terminal needs to use the truncated 5G-S-TMSI, the RRC layer of the terminal sends the truncated parameter to a NAS layer of the terminal. The NAS layer of the terminal truncates a 5G-S-TMSI based on the truncated parameter, to obtain the truncated 5G-S-TMSI. The NAS layer of the terminal sends the truncated 5G-S-TMSI to the RRC layer of the terminal.

Implementation 3: When a NAS layer of the terminal is responsible for storing a truncated parameter, when the terminal needs to use the truncated 5G-S-TMSI, the NAS layer of the terminal truncates a 5G-S-TMSI based on the truncated parameter, to obtain the truncated 5G-S-TMSI. The NAS layer of the terminal sends the truncated 5G-S-TMSI to an RRC layer of the terminal.

Implementation 4: When a NAS layer of the terminal is responsible for storing a truncated parameter, when the terminal needs to use the truncated 5G-S-TMSI, the NAS layer of the terminal sends the truncated parameter to an RRC layer of the terminal. Then, the RRC layer of the terminal truncates a 5G-S-TMSI based on the truncated parameter, to obtain the truncated 5G-S-TMSI.

It may be understood that the truncated parameter stored in the terminal is obtained by the terminal by using the technical solution shown in any one of FIG. 8 to FIG. 12.

The following further describes the RRC connection reestablishment procedure of the terminal that uses the control plane CIoT 5GS optimization function.

The terminal that uses the control plane CIoT 5GS optimization function does not have an available AS security context. Therefore, to protect the reestablishment procedure, an AS layer of the terminal triggers the NAS layer to provide UL_NAS_MAC and XDL_NAS_MAC. UL_NAS_MAC indicates that the terminal requests to reestablish an RRC connection, and XDL_NAS_MAC is used to indicate that the terminal is in a call with a real network.

It should be noted that the terminal sets Key to an integrity key (KNASint), sets a count to an uplink NAS count, sets DIRECTION to 0, and sets Message to a target cell ID and the entire RRC reestablishment request message that excludes a least significant bit (LSB) of the NAS count and UL_NAS_MAC. Then, the terminal inputs these parameters (for example, the key and the message) into a currently used integrity algorithm, to generate a NAS MAC.

The first 16 bits of the NAS MAC form UL_NAS_MAC, and the last 16 bits of the NAS MAC form XDL_NAS_MAC.

Then, the terminal sends the RRC reestablishment request message to the target access network device, where the RRC reestablishment request message includes the truncated 5G-S-TMSI and five least significant bits of the NAS count. The least significant bits of the NAS count are used to calculate the NAS MAC.

The target access network device restores a complete 5G-S-TMSI based on the truncated 5G-S-TMSI in the RRC reestablishment request message and locally configured truncated parameter (m and n). The target access network device may determine, based on the complete 5G-S-TMSI, a mobility management network element serving the terminal. In addition, the target access network device sends the 5G-S-TMSI, the target cell-ID, and the entire RRC reestablishment request message excluding the truncated 5G-S-TMSI to the mobility management network element.

The mobility management network element estimates a complete uplink NAS count by using an LSB of the NAS count associated with a NAS connection identifier "0x01". Then, the mobility management network element uses the estimated uplink NAS count to calculate XNAS-MAC.

The mobility management network element compares whether the first 16 bits of UL_NAS_MAC are the same as those of XNAS-MAC. When the first 16 bits of UL_NAS_MAC are the same as those of XNAS-MAC, the mobility management network element determines that a real terminal sends the RRC reestablishment request message.

Then, the mobility management network element sends a connection establishment indication message to the target access network device, where the connection establishment indication message includes DL_NAS_MAC. It should be noted that DL_NAS_MAC is the last 16 bits of XNAS-MAC.

The access network device sends an RRC reestablishment message to the terminal, where the RRC reestablishment message includes DL_NAS_MAC.

The terminal checks whether received DL_NAS_MAC is the same as XDL_NAS_MAC. If DL_NAS_MAC and XDL_NAS_MAC are the same, the terminal completes the RRC connection reestablishment procedure.

The foregoing mainly describes the solutions provided in the embodiments of this disclosure from a perspective of interaction between the network elements. It may be understood that, to implement the foregoing functions, each network element, for example, the terminal, the access network device, and the mobility management network element, includes a corresponding hardware structure or software module for performing each function, or a combination thereof. A person skilled in the art should be easily aware that units, algorithms, and steps in the examples described with reference to the embodiments disclosed in this specification can be implemented by hardware or a combination of hardware and computer software in this disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In the embodiments of this disclosure, function modules of the access network device, the mobility management network element, and the terminal may be obtained through division based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in this embodiment of this disclosure, division into the modules is an example, and is merely a logical function division. In actual implementation, another division manner may be used. An example in which each function module is obtained through division based on each corresponding function is used below for description.

Figure 13:
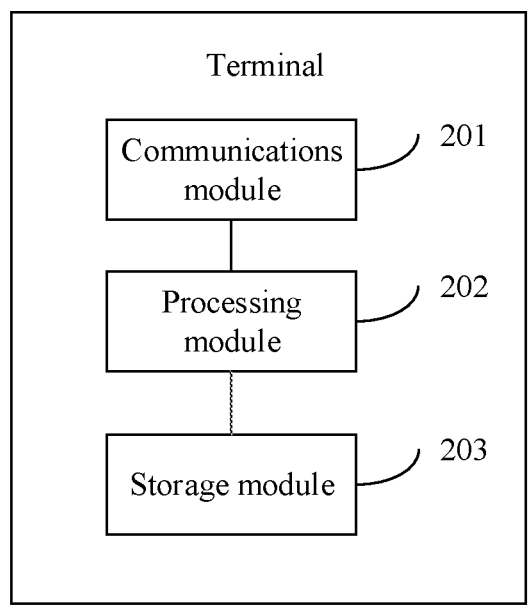
FIG. 13 is a schematic structural diagram of a terminal according to an embodiment of this disclosure.

FIG. 13 is a schematic structural diagram of a terminal according to an embodiment of this disclosure. As shown in FIG. 13, the terminal includes a communications module 201, a processing module 202, and a storage module 203. The communications module 201 is configured to support the terminal in performing step S102 in FIG. 8, steps S201 and S204 in FIG. 9, steps S301 and S305 in FIG. 10, step S403 in FIG. 11, steps S501 and S506 in FIG. 12, and/or another communication operation that needs to be performed by the terminal in the embodiments of this disclosure. The processing module 202 is configured to support the terminal in performing step S103 in FIG. 8, steps S202 and S205 in FIG. 9, step S306 in FIG. 10, step S404 in FIG. 11, steps S507 and S508 in FIG. 12, and/or another processing operation that needs to be performed by the terminal in the embodiments of this disclosure. The storage module 203 is configured to support the terminal in performing step S104 in FIG. 8, step S206 in FIG. 9, step S307 in FIG. 10, step S405 in FIG. 11, step S509 in FIG. 12, and/or another storage operation that needs to be performed by the terminal in the embodiments of this disclosure.

In an example, with reference to the apparatus shown in FIG. 7, the processing module 202 in FIG. 13 may be implemented by the processor 101 in FIG. 7, the communications module 201 in FIG. 13 may be implemented by the communications interface 104 in FIG. 7, and the storage module 203 in FIG. 13 may be implemented by the memory 103 in FIG. 7. This is not limited in the embodiments of this disclosure.

Figure 14:
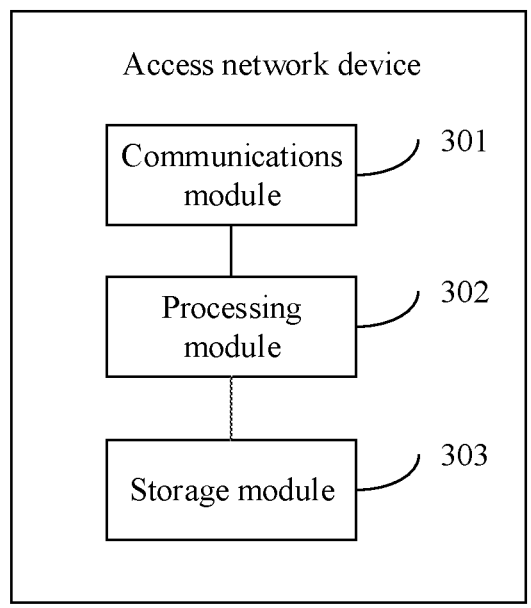
FIG. 14 is a schematic structural diagram of an access network device according to an embodiment of this disclosure.

FIG. 14 is a schematic structural diagram of an access network device according to an embodiment of this disclosure. As shown in FIG. 14, the access network device includes a communications module 301, a processing module 302, and a storage module 303. The communications module 301 is configured to support the access network device in performing steps S301 and S303 in FIG. 10, steps S501, S503, S505, and S506 in FIG. 12, and/or another communication operation that needs to be performed by the access network device in the embodiments of this disclosure. The processing module 302 is configured to support the access network device in performing step S302 in FIG. 10, step S502 in FIG. 12, and/or another processing operation that needs to be performed by the access network device in the embodiments of this disclosure. The storage module 303 is configured to support the access network device in performing step S300 in FIG. 10, step S500 in FIG. 12, and/or another storage operation that needs to be performed by the access network device in the embodiments of this disclosure.

In an example, with reference to the apparatus shown in FIG. 7, the processing module 302 in FIG. 14 may be implemented by the processor 101 in FIG. 7, the communications module 301 in FIG. 14 may be implemented by the communications interface 104 in FIG. 7, and the storage module 303 in FIG. 14 may be implemented by the memory 103 in FIG. 7. This is not limited in the embodiments of this disclosure.

Figure 15:
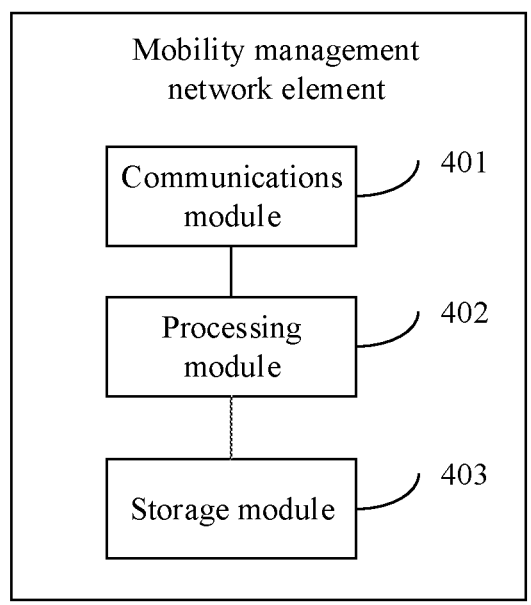
FIG. 15 is a schematic structural diagram of a mobility management network element according to an embodiment of this disclosure.

FIG. 15 is a schematic structural diagram of a mobility management network element according to an embodiment of this disclosure. As shown in FIG. 15, the mobility management network element includes a communications module 401, a processing module 402, and a storage module 403. The communications module 401 is configured to support the mobility management network element in performing step S102 in FIG. 8, steps S201 and S204 in FIG. 9, steps S303 and S305 in FIG. 10, step S403 in FIG. 11, steps S503 and S505 in FIG. 12, and/or another communication operation that needs to be performed by the mobility management network element in the embodiments of this disclosure. The processing module 402 is configured to support the mobility management network element in performing step S101 in FIG. 8, steps S202 and S203 in FIG. 9, step S304 in FIG. 10, steps S401 and S402 in FIG. 11, step S504 in FIG. 12, and/or another processing operation that needs to be performed by the mobility management network element in the embodiments of this disclosure. The storage module 403 is configured to support the mobility management network element in performing step S200 in FIG. 9, and/or another storage operation that needs to be performed by the mobility management network element in the embodiments of this disclosure.

In an example, with reference to the apparatus shown in FIG. 7, the processing module 402 in FIG. 15 may be implemented by the processor 101 in FIG. 7, the communications module 401 in FIG. 15 may be implemented by the communications interface 104 in FIG. 7, and the storage module 403 in FIG. 15 may be implemented by the memory 103 in FIG. 7. This is not limited in the embodiments of this disclosure.

An embodiment of this disclosure further provides a computer-readable storage medium. The computer-readable storage medium stores an instruction, and when the computer-readable storage medium runs on a computer, the computer is enabled to perform the method for protecting a truncated parameter provided in the embodiments of this disclosure.

An embodiment of this disclosure further provides a computer program product including a computer instruction. When the computer program product runs on a computer, the computer is enabled to perform the method for protecting a truncated parameter provided in the embodiments of this disclosure.

An embodiment of this disclosure provides a chip. The chip includes a processor. When executing an instruction, the processor enables the chip to perform the method for protecting a truncated parameter provided in the embodiments of this disclosure.

It should be understood that the computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

The foregoing descriptions about implementations allow a person skilled in the art to clearly understand that, for the purpose of convenient and brief description, division into only the foregoing function modules is used as an example for illustration. In actual application, the foregoing functions can be allocated to different function modules for implementation based on a requirement, that is, an inner structure of an apparatus is divided into different function modules to implement all or some of the functions described above.

It should be understood that in the several embodiments provided in this disclosure, the disclosed apparatuses and methods may be implemented in other manners. For example, the described apparatus embodiments are merely examples. For example, division into the modules or units is merely logical function division. There may be another division manner in actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions in the embodiments of this disclosure essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of this disclosure.

The foregoing descriptions are merely specific implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

What is claimed is:

1. A method implemented by an access and mobility management function network element, wherein the method comprises:
   determining whether a terminal uses a control plane cellular Internet of things (CIoT) 5th generation system (5GS) optimization function; and
   sending, to the terminal when the terminal uses the control plane CIoT 5GS optimization function, a downlink non-access stratum (NAS) message security-protected based on an NAS security context,
   wherein the downlink NAS message comprises a truncated parameter for truncating a 5th generation (5G)-system architecture evolution-temporary mobile subscriber identity (TMSI) (5G-S-TMSI) of the terminal,
   wherein the 5G-S-TMSI comprises an original access and mobility management function pointer and an original access and mobility management function set identifier,
   wherein the truncated parameter in the downlink NAS message comprises a first truncated parameter and a second truncated parameter,
   wherein the first truncated parameter indicates a first size of bits for truncating the original access and mobility management function pointer, and
   wherein the second truncated parameter indicates a second size of bits for truncating the original access and mobility management function set identifier.

2. The method of claim 1, wherein the truncated parameter is configured in the access and mobility management function network element.

3. The method of claim 1, wherein determining whether the terminal uses the control plane CIoT 5GS optimization function comprises determining, based on a preferred network behavior from the terminal, whether the terminal uses the control plane CIoT 5GS optimization function.

4. The method of claim 3, wherein determining, based on the preferred network behavior, whether the terminal uses the control plane CIoT 5GS optimization function comprises in response to the preferred network behavior indicating that the terminal prefers to use the control plane CIoT 5GS optimization function, and the access and mobility management function network element supporting the control plane CIoT 5GS optimization function, determining that the terminal uses the control plane CIoT 5GS optimization function.

5. The method of claim 1, wherein determining whether the terminal uses the control plane CIoT 5GS optimization function comprises:
   determining whether the terminal uses the control plane CIoT 5GS optimization function and whether the truncated parameter needs to be updated for the terminal, and
   wherein sending, to the terminal when the terminal uses the control plane CIoT 5GS optimization function, the downlink NAS message comprises sending, to the terminal when the terminal uses the control plane CIoT 5GS optimization function and the truncated parameter needs to be updated for the terminal, the downlink NAS message.

6. The method of claim 1, wherein before determining whether the terminal uses the control plane CIoT 5GS optimization function, the method further comprises receiving, from the terminal, a registration request message, and wherein the downlink NAS message is a registration accept message.

7. The method of claim 1, wherein the determining whether the terminal uses the control plane CIoT 5GS optimization function comprises:
   determining whether the terminal uses the control plane CIoT 5GS optimization function and whether the terminal is initially registered with a network, and
   wherein sending, to the terminal when the terminal uses the control plane CIoT 5GS optimization function, the downlink NAS message comprises sending, to the terminal when the terminal uses the control plane CIoT 5GS optimization function and the terminal is initially registered with the network.

8. A method implemented by an apparatus, wherein the method comprises:
receiving, from a mobility management network element, a downlink non-access stratum (NAS) message security-protected based on an NAS security context, wherein the downlink NAS message comprises a truncated parameter, wherein the truncated parameter is for truncating a 5th generation (5G)-system architecture evolution-temporary mobile subscriber identity (TMSI) (5G-S-TMSI) of the apparatus, and wherein the apparatus uses a control plane cellular Internet of things (CIoT) 5th generation system (5GS) optimization function;
performing security deprotection on the downlink NAS message; and
storing the truncated parameter when the security deprotection on the downlink NAS message is successful.

9. The method of claim 8, wherein storing the truncated parameter comprises storing, by a NAS layer of the apparatus, the truncated parameter.

10. The method of claim 8, further comprising:
sending, by a NAS layer, the truncated parameter to a Radio Resource Control (RRC) layer of the apparatus; and
truncating, by the RRC layer of the apparatus based on the truncated parameter, the 5G-S-TMSI to obtain a truncated 5G-S-TMSI.

11. The method of claim 8, further comprising:
truncating, based on the truncated parameter, the 5G-S-TMSI of the apparatus to obtain a truncated 5G-S-TMSI; and
sending, to an access network device, an RRC reestablishment request message comprising the truncated 5G-S-TMSI.

12. The method of claim 8, further comprising:
truncating, by a NAS layer of the apparatus, the 5G-S-TMSI of the apparatus based on the truncated parameter, to obtain a truncated 5G-S-TMSI; and
sending, by the NAS layer, the truncated 5G-S-TMSI to an RRC layer of the apparatus.

13. A communications apparatus comprising:
one or more processors; and
a memory coupled to the one or more processors and configured to store instructions that, when executed by the one or more processors, cause the communications apparatus to:
determine whether a terminal uses a control plane cellular Internet of things (CIoT) 5th generation system (5GS) optimization function; and
send, to the terminal when the terminal uses the control plane CIoT 5GS optimization function, a downlink non-access stratum (NAS) message security-protected based on an NAS security context,
wherein the downlink NAS message comprises a truncated parameter for truncating a 5th generation (5G)-system architecture evolution-temporary mobile subscriber identity (TMSI) (5G-S-TMSI) of the terminal,
wherein the 5G-S-TMSI comprises an original access and mobility management function pointer and an original access and mobility management function set identifier,
wherein the truncated parameter in the downlink NAS message comprises a first truncated parameter and a second truncated parameter,
wherein the first truncated parameter indicates a first size of bits for truncating the original access and mobility management function pointer, and
wherein the second truncated parameter indicates a second size of bits for truncating the original access and mobility management function set identifier.

14. The communications apparatus of claim 13, wherein the truncated parameter is configured in the communications apparatus.

15. The communications apparatus of claim 13, wherein determining whether the terminal uses the control plane CIoT 5GS optimization function comprises determining, based on a preferred network behavior from the terminal, whether the terminal uses the control plane CIoT 5GS optimization function.

16. The communications apparatus of claim 15, wherein determining, based on the preferred network behavior, whether the terminal uses the control plane CIoT 5GS optimization function comprises in response to the preferred network behavior indicating that the terminal prefers to use the control plane CIoT 5GS optimization function, and the communications apparatus supporting the control plane CIoT 5GS optimization function, determining that the terminal uses the control plane CIoT 5GS optimization function.

17. The communications apparatus of claim 13, wherein determining whether the terminal uses the control plane CIoT 5GS optimization function comprises:
determining whether the terminal uses the control plane CIoT 5GS optimization function and whether the truncated parameter needs to be updated for the terminal, and
wherein sending, to the terminal when the terminal uses the control plane CIoT 5GS optimization function, the downlink NAS message comprises sending, to the terminal when the terminal uses the control plane CIoT 5GS optimization function and the truncated parameter needs to be updated for the terminal, the downlink NAS message.

18. The communications apparatus of claim 13, wherein before determining whether the terminal uses the control plane CIoT 5GS optimization function, when executed by the one or more processors, the instructions further cause the communications apparatus to receive, from the terminal, a registration request message, and wherein the downlink NAS message is a registration accept message.

19. The communications apparatus of claim 13, wherein the 5G-S-TMSI further comprises an original 5G temporary mobile subscriber identity (5G-TMSI), wherein the truncated parameter is for truncating the 5G-S-TMSI to obtain a truncated 5G-S-TMSI, wherein the truncated 5G-S-TMSI comprises a truncated access and mobility management function pointer, a truncated access and mobility management function set identifier, and a truncated 5G-TMSI, wherein the truncated access and mobility management function pointer comprises m bits of the original access and mobility management function pointer, wherein the truncated access and mobility management function set identifier comprises n bits of the original access and mobility management function set identifier, wherein the truncated 5G-TMSI comprises (40-n-m) bits of the original 5G-TMSI, wherein m represents the first size, and wherein n represents the second size.

20. A communications apparatus comprising:
one or more processors; and
a memory coupled to the one or more processors and configured to store instructions that, when executed by the one or more processors, cause the communications apparatus to:
- receive, from a mobility management network element, a downlink non-access stratum (NAS) message security-protected based on an NAS security context, wherein the downlink NAS message comprises a truncated parameter, wherein the truncated parameter is for truncating a 5th generation (5G)-system architecture evolution-temporary mobile subscriber identity (TMSI) (5G-S-TMSI) of the communications apparatus, and wherein the communications apparatus uses a control plane cellular Internet of things (CIoT) 5th generation system (5GS) optimization function;
- perform security deprotection on the downlink NAS message; and
- store the truncated parameter when the security deprotection on the downlink NAS message is successful.

21. The communications apparatus of claim 20, wherein storing the truncated parameter comprises storing, by a NAS layer of the communications apparatus, the truncated parameter.

22. The communications apparatus of claim 20, wherein when executed by the one or more processors, the instructions further cause the communications apparatus to:
- send, by a NAS layer of the communications apparatus, the truncated parameter to a radio resource control (RRC) layer of the communications apparatus; and
- truncate, by the RRC layer of the communications apparatus based on the truncated parameter, the 5G-S-TMSI to obtain a truncated 5G-S-TMSI.

23. The communications apparatus of claim 20, wherein when executed by the one or more processors, the instructions further cause the communications apparatus to:
- truncate, based on the truncated parameter, the 5G-S-TMSI of the communications apparatus to obtain a truncated 5G-S-TMSI; and
- send, to an access network device, an RRC reestablishment request message comprising the truncated 5G-S-TMSI.

24. The communications apparatus of claim 20, wherein the 5G-S-TMSI comprises an original access and mobility management function pointer and an original access and mobility management function set identifier, wherein the truncated parameter comprises a first truncated parameter and a second truncated parameter, wherein the first truncated parameter indicates a first size of bits for truncating the original access and mobility management function pointer, and wherein the second truncated parameter indicates a second size of bits for truncating the original access and mobility management function set identifier.

* * * * *